United States Patent
Shinzato et al.

(10) Patent No.: US 12,363,433 B2
(45) Date of Patent: Jul. 15, 2025

(54) CONTROL APPARATUS, IMAGE STABILIZATION APPARATUS, OPTICAL APPARATUS, CONTROL METHOD, AND STORAGE MEDIUM

(71) Applicant: CANON KABUSHIKI KAISHA, Tokyo (JP)

(72) Inventors: Yuki Shinzato, Saitama (JP); Tomohiro Ino, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 140 days.

(21) Appl. No.: 18/471,403

(22) Filed: Sep. 21, 2023

(65) Prior Publication Data

US 2024/0114244 A1 Apr. 4, 2024

(30) Foreign Application Priority Data

Sep. 26, 2022 (JP) ................................. 2022-152405

(51) Int. Cl.
*H04N 23/68* (2023.01)
(52) U.S. Cl.
CPC ......... *H04N 23/683* (2023.01); *H04N 23/687* (2023.01)
(58) Field of Classification Search
CPC .................................................. H04N 23/683
See application file for complete search history.

(56) References Cited

U.S. PATENT DOCUMENTS

| | | | |
|---|---|---|---|
| 10,244,157 B2 * | 3/2019 | Sugita ...................... G02B 7/34 |
| 11,800,226 B2 * | 10/2023 | Shinzato .............. H04N 23/663 |
| 12,052,500 B2 * | 7/2024 | Shinzato ............. H04N 23/6842 |
| 2016/0261806 A1 * | 9/2016 | Honjo ................. H04N 23/6812 |
| 2017/0019600 A1 | 1/2017 | Koyano |
| 2017/0257574 A1 * | 9/2017 | Honjo ................... H04N 23/687 |
| 2021/0195110 A1 * | 6/2021 | Ino .......................... H04N 23/67 |
| 2021/0243372 A1 * | 8/2021 | Sugita .................. H04N 23/663 |
| 2023/0217112 A1 * | 7/2023 | Ino ........................ H04N 23/687 |
| | | | 348/207.99 |

FOREIGN PATENT DOCUMENTS

| | | |
|---|---|---|
| EP | 4054175 A1 | 9/2022 |
| JP | 2017044876 A | 3/2017 |

OTHER PUBLICATIONS

Extended European Search Report issued in European Appln. No. 23198105.1 mailed Feb. 23, 2024.

* cited by examiner

*Primary Examiner* — Cynthia Segura
(74) *Attorney, Agent, or Firm* — ROSSI, KIMMS & McDOWELL LLP

(57) ABSTRACT

A control apparatus sets a control ratio in accordance with image shift sensitivities for tilt of an optical system and image shift sensitivities for drive of first and second image stabilization units, the control ratio with which an image blur at an image central part is corrected and an image blur residue amount at an image peripheral part is reduced, in a case where the image shift sensitivities for tilt of the optical system for each image height in first and second image height directions different are different, the image shift sensitivities for drive of the first and second image stabilization units in the first image height direction are different from each other, and the image shift sensitivities for drive of the first and second image stabilization units in the second image height direction are different.

20 Claims, 16 Drawing Sheets

IMAGE HEIGHT $h_r$ [mm] OF IMAGE POINT
MOVEMENT DIRECTION AT IMAGE CENTER PART

IMAGE HEIGHT $h_\theta$ [mm] IN DIRECTION
ORTHOGONAL TO IMAGE POINT MOVING
DIRECTION AT IMAGE CENTER PART STARTING POINT OF ARROW: IMAGE POINT POSITION OF OBJECT IMAGE IN STATIONARY STATE
END POINT OF ARROW: IMAGE POINT POSITION OF OBJECT IMAGE WHEN ANGULAR SHAKE OCCURS STARTING POINT OF ARROW: IMAGE POINT POSITION OF OBJECT IMAGE IN STATIONARY STATE
END POINT OF ARROW: IMAGE POINT POSITION OF OBJECT IMAGE AFTER IMAGE STABILIZATION FOR ANGULAR SHAKE

CONTROL APPARATUS, IMAGE STABILIZATION APPARATUS, OPTICAL APPARATUS, CONTROL METHOD, AND STORAGE MEDIUM

BACKGROUND

Technical Field

One of the aspects of the present disclosure relates to a technology of controlling an image stabilization (IS) function to correct an image blur.

Description of Related Art

An optical apparatus such as a digital camera, a video camera, a smartphone camera, or an interchangeable lens has an image stabilization function to correct image blur that occurs due to camera shake such as manual shake. The image stabilization function is achieved by shifting a lens or an image sensor in accordance with camera shake.

However, in an optical system of the central projection scheme, the amount of image point movement on the image plane due to camera shake is different between an image central part and an image peripheral part. The image point movement amount of the image peripheral part is larger as compared to that of the image central part as the optical system has a wider angle of view, in particular.

FIG. 18A illustrates the amount (defined to be one at the image central part) and direction of movement at each image point at the image central part and the image peripheral part in a case where image blurs in the -X direction occur at the image central part due to camera shake (angle shake). FIG. 18B illustrates the amount (defined to be zero at the image central part) and direction of an image blur residue at each image point in a case where the image blurs at the image central part in FIG. 18A are corrected by shifting the image sensor. Since the image point movement amount is larger at the image peripheral part than at the image central part as illustrated in FIG. 18A, the image blur residue amount is larger at the image peripheral part than at the image central part where image blurs are excellently corrected as illustrated in FIG. 18B.

Japanese Patent Laid-open No. 2017-044876 discloses an image stabilization technology that image point positions at which image stabilization is performed are shifted from positions on the optical axis by using a correction coefficient calculated from the projection scheme and focal length of an optical system, image point positions, and the amount of angle shake. According to the technology, it is possible to reduce the difference of the image blur residue amount on the entire image plane from an allowable image blur error amount.

However, with the image stabilization technology of Japanese Patent Laid-open No. 2017-044876, it is needed to set the allowable error amount to be large to reduce the difference of the image blur residue amount on the entire image plane in a case of a large image blur amount. In this case, the image blur amount up to the allowable error amount is allowed at the image central part in a case where image blurs have occurred, and thus image blurs in a main object image that is often positioned at the image central part at image pickup cannot be excellently corrected. With a wide-angle optical system of the central projection scheme, the difference of the image point movement amount at the image peripheral part from the image point movement amount at the image central part increases, and thus it is difficult to reduce the difference of the image blur residue amount on the entire image plane.

SUMMARY

A control apparatus according to one aspect of the embodiment is configured to set a control ratio of control of drive of a first image stabilization unit and a second image stabilization unit that correct an image blur along with shake of an optical apparatus including an optical system. The control apparatus includes a memory storing instructions, and a processor configured to execute the instructions to set, as the control ratio in accordance with image shift sensitivities for tilt of the optical system and image shift sensitivities for drive of the first and second image stabilization units, the control ratio with which an image blur at an image central part is corrected and an image blur residue amount at an image peripheral part is reduced, in a case where the image shift sensitivities for tilt of the optical system for each image height in a first image height direction and a second image height direction different from each other, respectively, are different from each other, the image shift sensitivities for drive of the first and second image stabilization units, respectively, in the first image height direction are different from each other, and the image shift sensitivities for drive of the first and second image stabilization units, respectively, in the second image height direction are different from each other. An image stabilization apparatus and an optical apparatus each having the above control apparatus also constitute another aspect of the embodiment. A control method corresponding to the above control apparatus also constitutes another aspect of the embodiment. A storage medium storing a program that causes a computer to execute the above control method also constitutes another aspect of the embodiment.

One of the aspects of the present disclosure provides a control apparatus and a control method that can excellently perform image stabilization at an image central part and reduce an image blur residue amount at an image peripheral part.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Examples of the present disclosure will be described below with reference to the accompanying drawings. In the following description, in a three-dimensional orthogonal coordinate system including an X-axis, a Y-axis, and a Z-axis, the X-axis and Y-axis directions are defined to be the long-side and short-side directions, respectively, of an imaging surface, and the Z-axis direction is defined to be the optical axis direction of an image pickup optical system.

EXAMPLE 1

Figure 1:
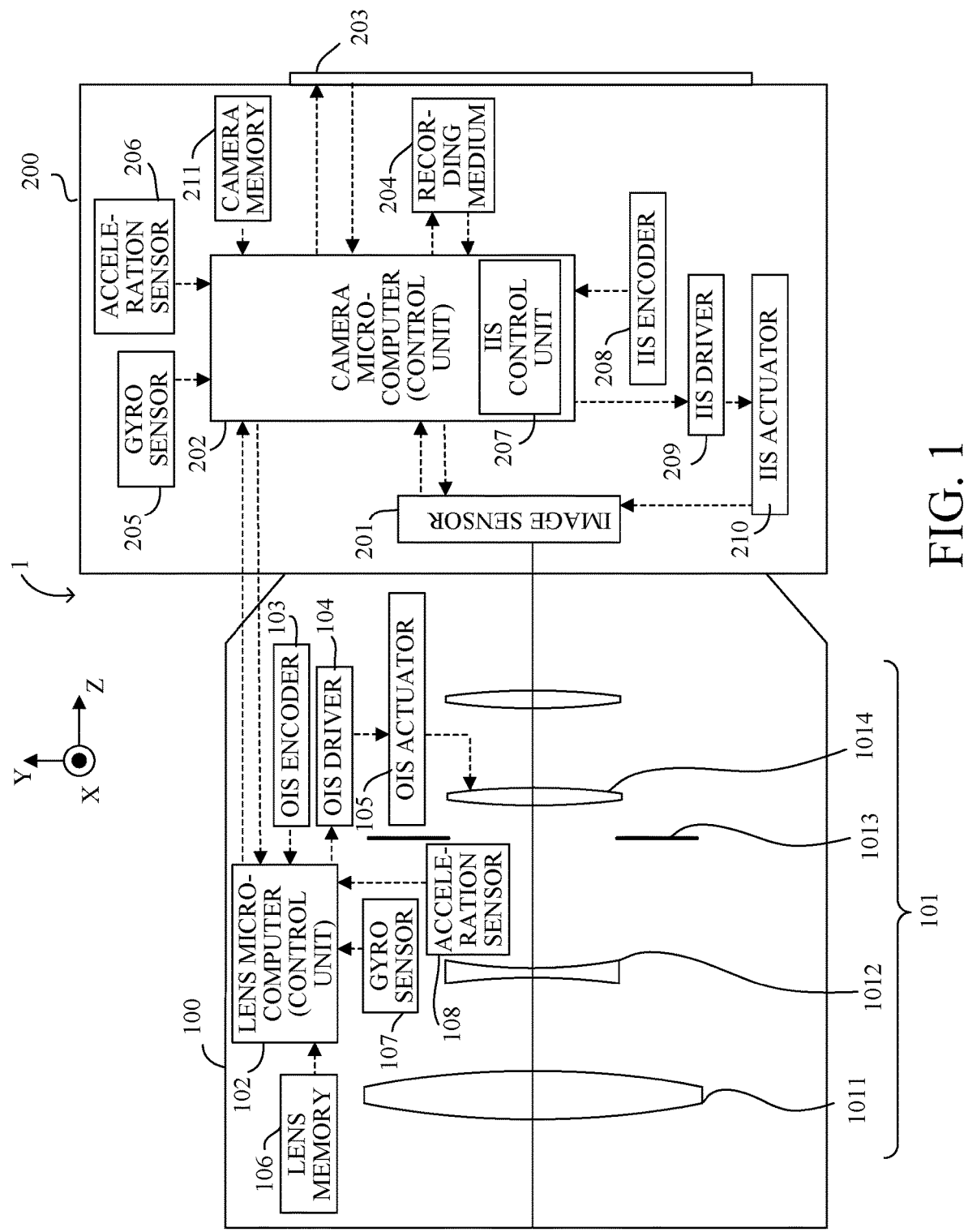
FIG. 1 is a block diagram illustrating the configuration of an image pickup system according to Example 1.

FIG. 1 illustrates the configuration of an image pickup system 1 that is Example 1 of the present disclosure. The image pickup system 1 includes a lens apparatus 100 and an image pickup apparatus 200 as optical apparatuses. The lens apparatus 100 is detachable from the image pickup apparatus 200 and can communicate with the image pickup apparatus 200.

The lens apparatus 100 includes an image pickup optical system 101, a lens microcomputer 102, an optical image stabilization (OIS) encoder 103, an OIS driver 104, an OIS actuator 105, and a lens memory (storage means) 106. OIS is an abbreviation for optical (lens) image stabilization.

The image pickup apparatus 200 includes an image sensor 201, a camera microcomputer 202, a display-operation unit 203, and a recording medium 204. The image pickup apparatus 200 also includes a gyro sensor 205, an acceleration sensor 206, an image-sensor image stabilization (IIS) encoder 208, an IIS driver 209, an IIS actuator 210, and a camera memory 211. IIS is an abbreviation for intelligent image stabilization.

The lens microcomputer 102 and the camera microcomputer 202 may be configured as apparatuses different from the lens apparatus 100 and the image pickup apparatus 200, respectively.

The image pickup optical system 101 includes a focus optical system 1011, a variable-magnification optical system 1012, an aperture stop 1013, and an OIS optical system 1014. The image pickup optical system 101 images light from an object onto an image plane (the imaging surface of the image sensor 201). The focus optical system 1011 moves in the optical axis direction to perform focusing. The variable-magnification optical system 1012 moves in the optical axis direction to perform magnification-varying (zooming) for changing an image pickup view angle (focal length). The aperture stop 1013 adjusts the quantity of light reaching the image sensor 201 from the object.

The image sensor 201 is configured as a photoelectric conversion element such as a charge coupled device (CCD) sensor or a complementary metal oxide semiconductor (CMOS) sensor. The image sensor 201 converts into an electric signal (in other words, captures) an object image formed on the imaging surface through the image pickup optical system 101 and outputs an analog image signal. The analog image signal is converted into a digital image signal by a non-illustrated A/D converter. In this example, image stabilization can be performed by decentering (shifting) the image sensor (second image stabilization unit) 201 in a direction orthogonal to the optical axis. In the following description, an image central part refers to a part of the object image formed on the imaging surface, the part being positioned near the optical axis of the image pickup optical system 101, and an image peripheral part refers to a part on the peripheral side of the image central part.

The OIS optical system (image stabilization lens unit as a first image stabilization unit) 1014 is decentered (shifted) in the direction orthogonal to the optical axis of the image pickup optical system 101 to perform image stabilization (image stabilization). The shift in the direction orthogonal to the optical axis includes both shift in a plane orthogonal to the optical axis and shift in a curved surface displaced in the direction orthogonal to the optical axis and in the optical axis direction.

The lens microcomputer 102 as a drive control unit controls shift drive of the OIS optical system 1014 as described below. The lens microcomputer 102 receives an OIS drive amount from the camera microcomputer 202 as described later and calculates the drive amount of the OIS actuator 105 by using the OIS drive amount and a position signal from the OIS encoder 103 that detects the position of the OIS optical system 1014. Then, the lens microcomputer 102 outputs the drive amount to the OIS driver 104. The drive amount of the OIS actuator 105 is determined so that the OIS optical system 1014 is not shifted beyond its allowable shift range.

The OIS actuator 105 receives a drive signal in accordance with the drive amount from the OIS driver 104 and shifts the OIS optical system 1014 in the direction orthogonal to the optical axis for image stabilization.

The lens memory 106 holds optical designing information of the image pickup optical system 101. The optical designing information includes information on the variable focal length of the image pickup optical system 101 in zooming, information on the range of an object distance (hereinafter referred to as in-focus object distance) at which in-focus is possible by focusing, and information about image stabilization (IS) control in accordance with the focal length and the in-focus object distance. The information about IS control is information acquired by using designed values of the image pickup optical system 101 and includes information about image shift sensitivity to be described later. The information about IS control in this example is information with taken into account change of image shift sensitivity at a peripheral image height due to distortion of the image pickup optical system 101.

When such camera shake (angle shake) of the image pickup system 1 has occurred that the imaging surface is tilted relative to the optical axis, it is possible to derive, by using the information about IS control, the control ratio of OIS and IIS with which image blurs at the image central part are excellently corrected and image blur residue amounts of the image peripheral part are reduced. The control ratio of OIS and IIS is such that, for example, 50% of image blur is corrected by OIS and the other 50% is corrected by IIS. The camera memory 211 may hold the optical designing information of the image pickup optical system 101 including the information about IS control. Alternatively, the lens memory 106 and the camera memory 211 may both hold the optical designing information of the image pickup optical system 101 including the information about IS control.

The image pickup optical system 101 has distortion DIST(h) expressed by equations (1) and (2) below.

$$\mathrm{DIST}(h) = (h - h0)/h0 \quad (1)$$

$$h0 = f \times \tan \omega \quad (2)$$

In equations (1) and (2), f represents the focal length of the image pickup optical system 101, and ω represents half angle of view, h represents distance (real image height) from a position corresponding to the optical axis on the image plane to a position at which a principal ray incident from an object with half angle of view ω is imaged, and h0 represents an ideal image height of the central projection scheme.

Having distortion means a non-zero amount of distortion at any image height in the image pickup view angle, in other words, means having an image height of h ≠h0. Image pickup optical systems having distortion include an image pickup optical system having a zooming function or a focusing function and having distortion in any zoom state or in-focus state.

The camera microcomputer 202 controls not only the image pickup apparatus 200 but also the entire image pickup system 1. The camera microcomputer 202 reads, as image data, the digital image signal from the image sensor 201, provides the image data with image processing based on the optical designing information, displays the image data on the display-operation unit 203, and stores the image data in the recording medium 204. In addition, the camera microcomputer 202 may transmit, to the lens microcomputer 102, instructions for focus drive, zoom drive, aperture drive, and the like of the image pickup optical system 101. Settings related to these processes may be changed in accordance with an user operation through the display-operation unit 203 or an operation member such as a non-illustrated button.

Figure 2:
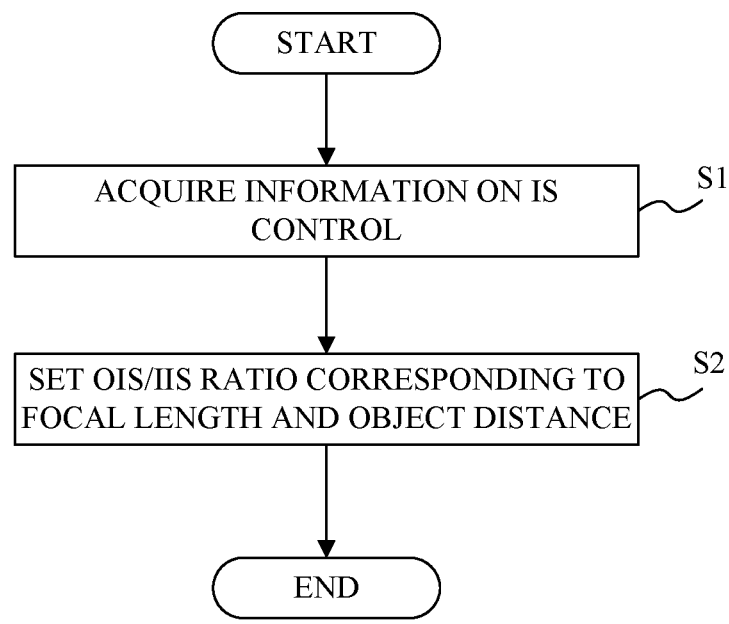
FIG. 2 is a flowchart illustrating processing in Example 1.

The camera microcomputer 202 as a control apparatus (setting unit) sets the above-described control ratio of OIS and IIS. FIG. 2 illustrates a flowchart of processing (control method) of acquiring the OIS-IIS ratio, which is executed by the camera microcomputer 202 in accordance with a computer program.

At step S1, the camera microcomputer 202 as an acquisition unit acquires, from the lens microcomputer 102 (lens memory 106), the information about IS control with taken into account change of image shift sensitivity at a peripheral image height due to distortion of the image pickup optical system 101. As described above, the information about IS control includes the information about image shift sensitivity. The information about image shift sensitivity may be information indicating image shift sensitivity for tilt of the image pickup optical system 101 or image shift sensitivity for an OIS or IIS drive amount or may be information with which image shift sensitivity can be calculated. Alternatively, the information about image shift sensitivity may be image stabilization sensitivity information calculated from image shift sensitivity information or may be optimum control ratio information to be described later.

Subsequently at step S2, the camera microcomputer 202 sets the OIS-IIS ratio by using the information about IS control in accordance with the focal length and object distance of the image pickup optical system 101. In this case, the camera microcomputer 202 may acquire and set the OIS-IIS ratio by calculation using the information about IS control. Alternatively, information about the OIS-IIS ratio calculated for each focal length or object distance by using the information about IS control in advance may be stored as table data in a storage such as a server or a memory. Then, the OIS-IIS ratio in accordance with a focal length or object distance to be used may be read and set from the table data. The information about the OIS-IIS ratio may be data of the OIS-IIS ratio or may be information that can be converted into the OIS-IIS ratio.

The camera microcomputer 202 functions as the acquisition unit and the setting unit in this example, but the lens microcomputer 102 may function as the acquisition unit and the setting unit.

In FIG. 1, the gyro sensor 205 included in the image pickup apparatus 200 outputs an angle shake signal in accordance with the angular velocity of angle shake of the image pickup system 1. In addition, the acceleration sensor 206 outputs a shift shake signal in accordance with motion (shift shake) of the image pickup system 1 in the translation direction. When having received the angle shake signal and the shift shake signal from the gyro sensor 205 and the acceleration sensor 206, the camera microcomputer 202 calculates an OIS drive amount and an IIS drive amount in accordance with the OIS-IIS ratio acquired beforehand. Then, the camera microcomputer 202 transmits information of the OIS drive amount to the lens microcomputer 102 and passes information of the IIS drive amount to an IIS control unit 207 in the camera microcomputer 202.

The IIS control unit (drive control unit) 207 determines the drive amount of the IIS actuator 210 by using the IIS drive amount from the camera microcomputer 202 and a position signal from the IIS encoder 208 that detects the position of the image sensor 201. Then, the IIS control unit outputs the drive amount to the IIS driver 209. The drive amount of the IIS actuator 210 is determined so that the image sensor 201 is not shifted beyond its allowable shift range. The IIS actuator 210 receives a drive signal in accordance with the drive amount from the IIS driver 209 and shifts the image sensor 201 in the direction orthogonal to the optical axis to correct image blur. Having received the information of the OIS drive amount, the lens microcomputer 102 shifts the OIS optical system 1014 in the direction orthogonal to the optical axis to correct image blur as described above.

In this manner, the camera microcomputer 202 as an image stabilization apparatus performs OIS-IIS cooperative control on the lens microcomputer 102 that shift drive of the OIS optical system 1014 is controlled in accordance with the OIS drive amount and shift drive of the image sensor 201 is controlled in accordance with the IIS drive amount. Accordingly, image blur due to angle shake and shift shake of the image pickup system 1 is corrected.

The lens apparatus 100 of this example includes a gyro sensor 107 and an acceleration sensor 108. Thus, the lens microcomputer 102 can calculate an OIS drive amount and an IIS drive amount by performing processing similar to the processing in FIG. 2 by using an angle shake signal from the gyro sensor 107 and a shift shake signal from the acceleration sensor 108. Moreover, OIS may be controlled by using the OIS drive amount calculated by the lens microcomputer 102, and IIS may be controlled by using the IIS drive amount calculated by the camera microcomputer 202. The following description will be mainly made on image stabilization for angle shake of the image pickup system 1, but image stabilization for shift shake can be performed in a similar manner to the image stabilization for angle shake.

The following describes an image blur residue at the image peripheral part at conventional image stabilization and also describes OIS and IIS control for performing image stabilization reduces the image blur residue.

Image Blur Residue at Image Peripheral Part

Figure 3A:
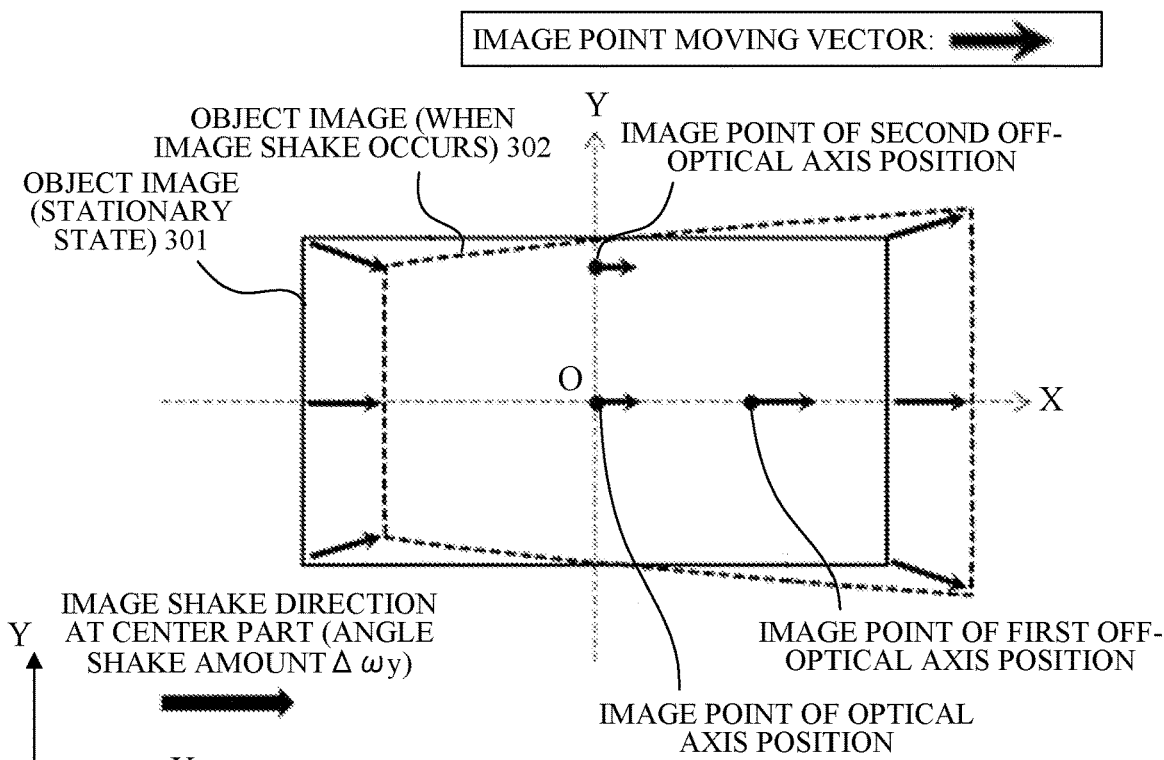
FIGS. 3A and 3B illustrate an image point movement vector at each image point position at angle shake occurrence and after image stabilization in Example 1.

FIG. 3A illustrates image point movement at the image peripheral part along with image point movement at the image central part in a case where angle shake of an angle shake amount $\Delta\omega_y$ has occurred about the Y axis. An object image 301 at rest changes to an object image 302 distorted into a trapezoid shape due to image blur. Trapezoid distortion like the object image 302 is large in a case where angle shake has occurred to a wide-angle lens in which distortion that occurs in an image pickup optical system of the central projection scheme is optically corrected. Image blur occurs as image points on the imaging surface move in accordance with image point movement vectors illustrated with arrows.

Figure 3B:
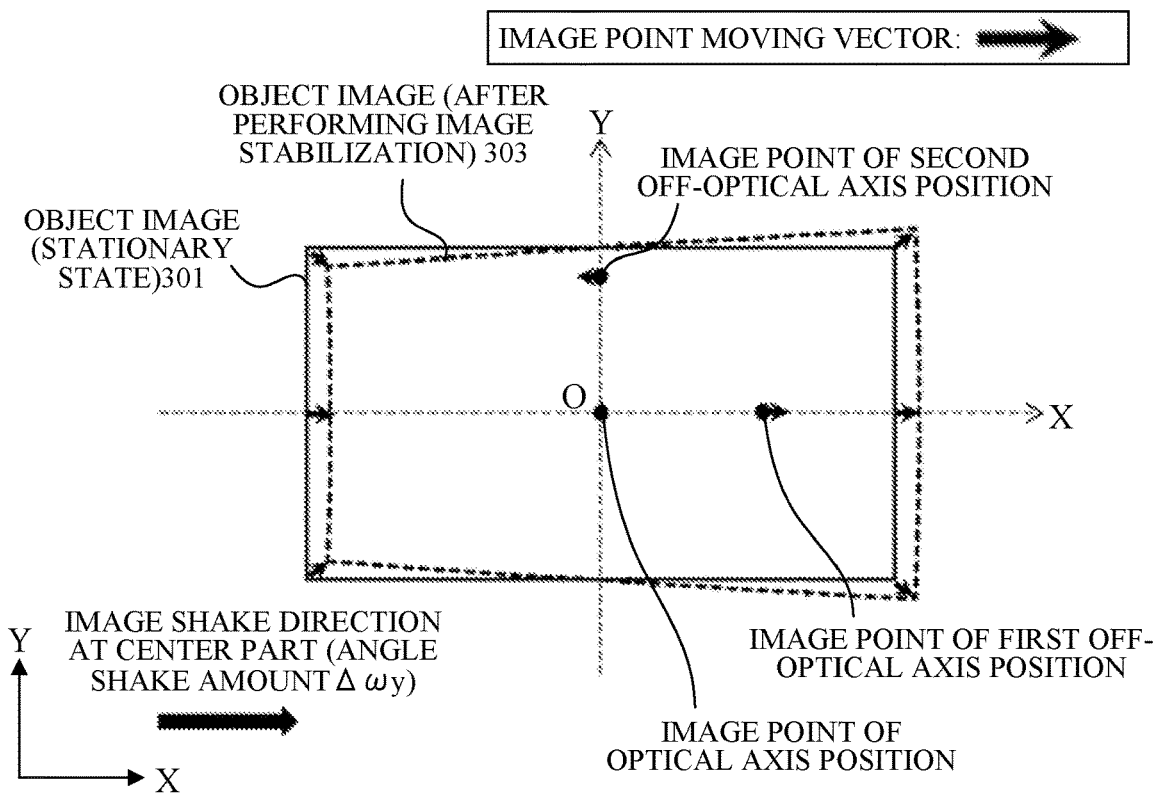

FIG. 3B illustrates definitive image point movement at positions off the optical axis on an object image 303 after image stabilization of the object image 301 at rest in a case where image blur that occurs at the image central part due to the angle shake illustrated in FIG. 3A is corrected with OIS alone. Image blurs at the image central part are excellently corrected (in other words, the magnitude of the corresponding image point movement vector is zero), but non-zero image point movement vectors remain at the image peripheral part because of insufficient correction or excessive correction of image point movement caused by the angle shake. This is the main cause of image blur residues at the image peripheral part. The magnitudes and directions of image point movement vectors as the image blur residues are related with object image deformation due to trapezoid distortion at angle shake occurrence and decentering distortion that occurs in image stabilization with OIS.

OIS and IIS control for reducing image blur residue amount at image peripheral part In this example, two image stabilization units (OIS and IIS units) having image stabilization sensitivities different from each other for each image height cooperatively controlled to perform favorable image stabilization at the image central part and reduce the image blur residue amount at the image peripheral part. Specifically, the above-described two image stabilization units are cooperatively controlled at a control ratio with which image blur is reduced at the image peripheral part in two axial directions (a first off-optical axis direction and a second off-optical axis direction to be described later) with an origin O at the position of the optical axis with respect to the direction of image blur that occurs at the image central part on the imaging surface due to camera shake.

Image Stabilization Sensitivity

In this example, image stabilization sensitivity is a characteristic of each image stabilization unit, which indicates a drive amount of the image stabilization unit necessary for canceling image blur that occurs at an optional image point position due to angle shake in a predetermined direction, and means a drive amount of the image stabilization unit for the unit angle shake amount of the image pickup optical system 101, the drive amount being necessary for canceling the amount of image point movement that occurs at the optional image point position in accordance with the angle shake amount. OIS sensitivity refers to the drive amount of the OIS optical system 1014 with respect to the optical axis in OIS, the drive amount being necessary for canceling the image point movement amount for the unit angle shake amount of the image pickup optical system 101. IIS sensitivity refers to the drive amount of the image sensor 201 with respect to the optical axis in IIS, the drive amount being necessary for canceling the image point movement amount for the unit angle shake amount of the image pickup optical system 101.

The image stabilization sensitivity for angle shake is calculated from tilt-image shift sensitivity and decentering-image shift sensitivity that are each information about image shift sensitivity. The tilt-image shift sensitivity indicates the image point movement amount at each image point position (for each image height) on the imaging surface in a case where the image pickup optical system 101 is tilted by the unit angle in a predetermined direction. The decentering-image shift sensitivity indicates the image point movement amount at each image point position in a case where the image stabilization unit is shifted (decentered) by the unit drive amount. Each shift sensitivity may be referred to as image point movement sensitivity. The decentering-image shift sensitivity used in OIS is OIS decentering-image shift sensitivity, and the decentering-image shift sensitivity used in IIS is IIS decentering-image shift sensitivity.

At step S1 in FIG. 2, the camera microcomputer 202 acquires information about IS control from information about image shift sensitivity. The information about image shift sensitivity may be information indicating the tilt-image shift sensitivity and the decentering-image shift sensitivity or may be information that can be converted into them.

The image height at a first off-optical axis position (first image height position) in the first off-optical axis direction (first image height direction) is represented by $h_r$, the first off-optical axis direction being an image height direction from the optical axis position (origin) O on the imaging surface illustrated in FIGS. 3A and 3B and being an image blur direction at the image center. The image height at a second off-optical axis position (second image height position) in the second off-optical axis direction (second image height direction) is represented by $h_\theta$, the second off-optical axis direction being an image height direction orthogonal to the first off-optical axis direction.

The tilt-image shift sensitivity is the image point movement amount on the imaging surface in a direction orthogonal to a predetermined axis orthogonal to the optical axis of the image pickup optical system 101 in a case where the image pickup optical system 101 is tilted about the axis. An image point movement direction at the optical axis position O is defined to be positive, and the opposite direction thereto is defined to be negative.

Figure 4A:
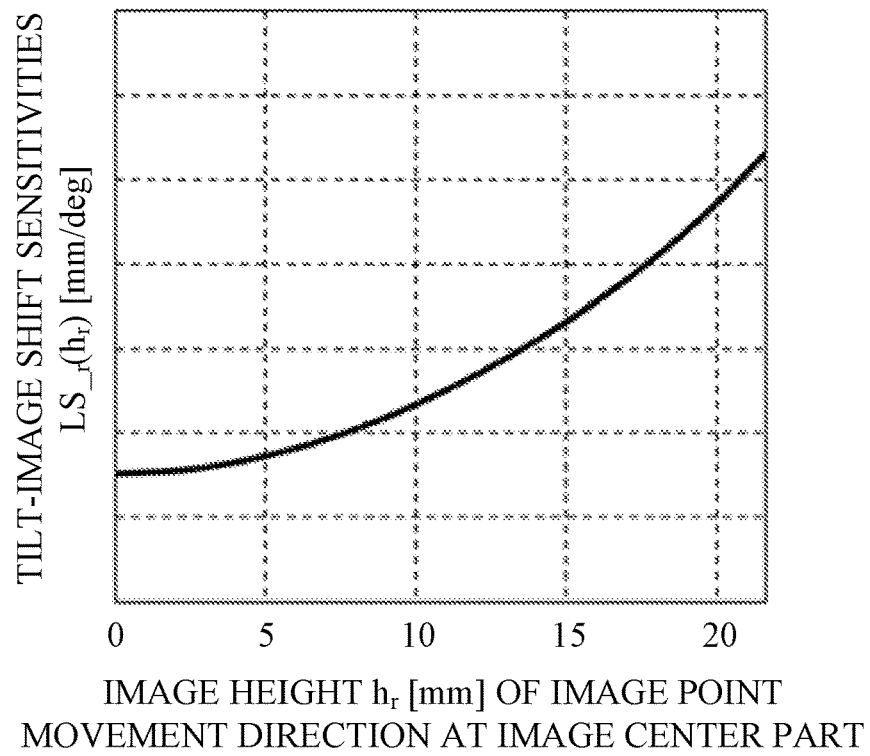
FIGS. 4A and 4B illustrate tilt-image shift sensitivities in Example 1.

FIG. 4A illustrates the relation between the image height h r in the first off-optical axis direction and tilt-image shift sensitivity $LS_{\_r}(h_r)$ in a case where the image pickup optical system 101 is tilted. As illustrated in FIG. 4A, in a case where the image pickup optical system 101 designed so that distortion in the central projection scheme is optically corrected is tilted, the image point movement amount in the positive direction increases as the image height h r increases.

Figure 4B:
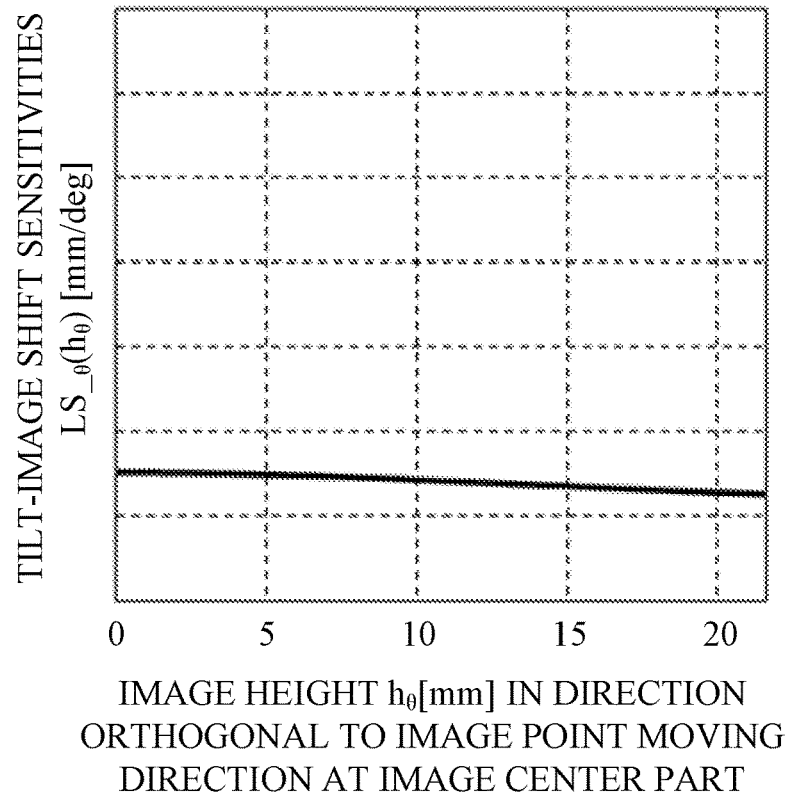

FIG. 4B illustrates the relation between the image height $h_\theta$ in the second off-optical axis direction and tilt-image shift sensitivity $LS_{\_\theta}(h_\theta)$ in a case where the image pickup optical system 101 is tilted. As illustrated in FIG. 4B, in a case where the image pickup optical system 101 designed to allow negative distortion, in other words, barrel-type distortion to some extent in the central projection scheme is tilted, the image point movement amount in the positive direction decreases as the image height $h_\theta$ in the second off-optical axis direction increases.

In this example, by using each tilt-image shift sensitivity acquired based on designed values of the image pickup optical system 101, it is possible to derive the image point movement amount for each image height at angle shake occurrence without performing an image height scheme based on the projection scheme, arithmetic processing using the amount of distortion, nor the like. Each tilt-image shift sensitivity in this example is a value obtained by dividing, by 0.5°, the image point movement amount in a case where the image pickup optical system 101 is tilted by 0.5° about a predetermined axis. However, this is merely exemplary and an angle other than 0.5° may be used as the tilt angle of the image pickup optical system 101. A method of acquiring each tilt-image shift sensitivity will be described later.

The decentering-image shift sensitivity is the image point movement amount in a decentering direction for the unit decentering amount of the image stabilization unit from the optical axis of the image pickup optical system 101. For convenience of description, the decentering direction is defined to be the first off-optical axis direction from the optical axis position O. The decentering-image shift sensitivity in a case where the OIS unit is driven is referred to as the OIS decentering-image shift sensitivity, and the decentering-image shift sensitivity in a case where the IIS unit is driven is referred to as the IIS decentering-image shift sensitivity.

Figure 5A:
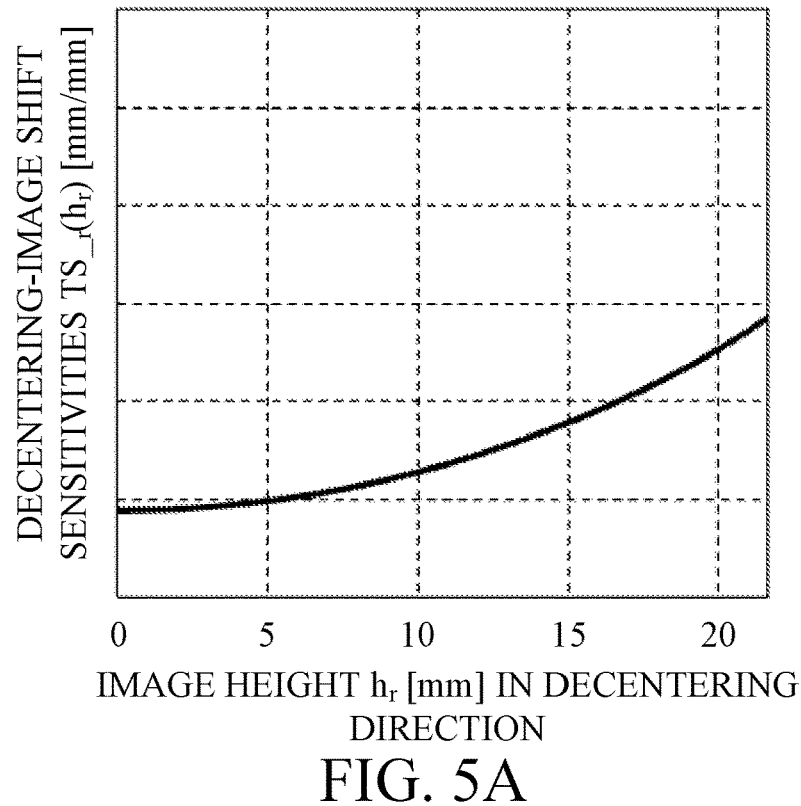
FIGS. 5A and 5B illustrate decentering-image shift sensitivities in Example 1.
Figure 5B:
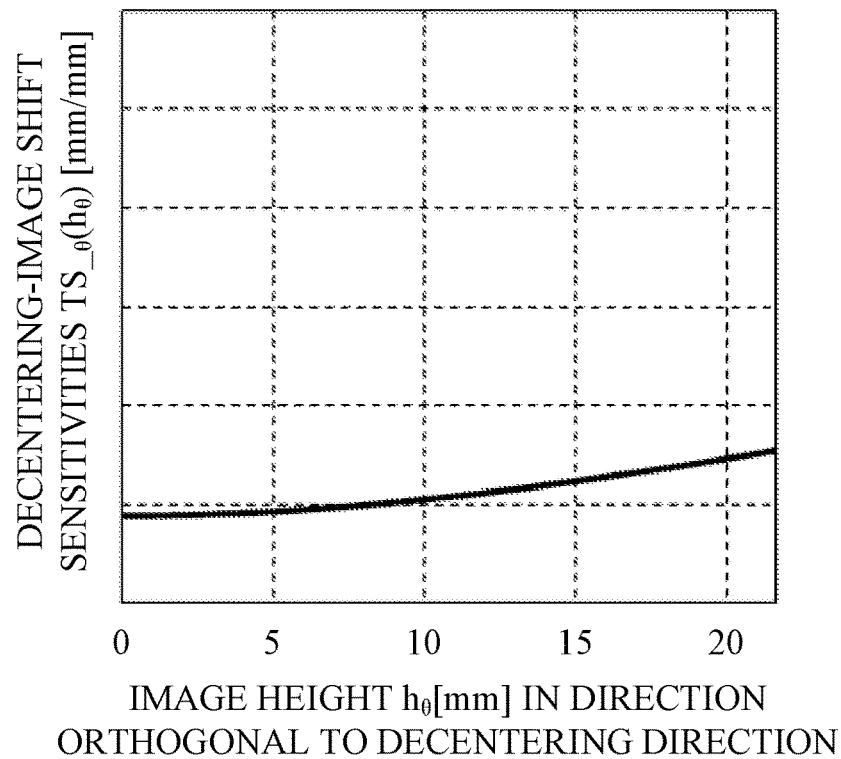

FIG. 5A illustrates the relation between the image height h r in the first off-optical axis direction and OIS decentering-image shift sensitivity $TS_{\_r}(h_r)$ in a case where the OIS optical system 1014 is decentered. FIG. 5B illustrates the relation between the image height $h_\theta$ in the second off-optical axis direction and OIS decentering-image shift sensitivity $TS_{\_\theta}(h_\theta)$ in a case where the OIS optical system 1014 is decentered. As illustrated in these diagrams, the image point movement amount in a case where the OIS optical system 1014 is decentered increases as the image height increases. In this example, by using each OIS decentering-image shift sensitivity acquired based on designed values of the image pickup optical system 101, it is possible to derive the image point movement amount for each image height at decentering of the OIS optical system 1014. Each OIS decentering-image shift sensitivity in this example is a value obtained by dividing, by 0.1 mm, the image point movement amount in a case where the OIS optical system 1014 is decentered by 0.1 mm. However, this is merely exemplary and a decentering amount other than 0.1 mm may be used as the decentering amount of the OIS optical system 1014. A method of acquiring each OIS decentering-image shift sensitivity will be described later.

As for the IIS decentering-image shift sensitivity, in a case where the image sensor 201 is decentered with respect to the image pickup optical system 101 forming an object image, each image point is moved by the decentering amount of the image sensor 201 in a direction opposite the decentering direction of the image sensor 201 irrespective of the image heights $h_r$ and $h_\theta$. Accordingly, the image point movement amount at any image height is constantly equal to the decentering amount of the image sensor 201 in the direction opposite the decentering direction of the image sensor 201. Thus, the IIS decentering-image shift sensitivity has a constant value (=−1 mm/mm) irrespective of the image height. For example, in a case where the image sensor 201 is shifted by +1 mm in the Y direction by IIS, the image point movement amount relative to the image sensor 201 is −1 mm in the Y direction.

Figure 6A:
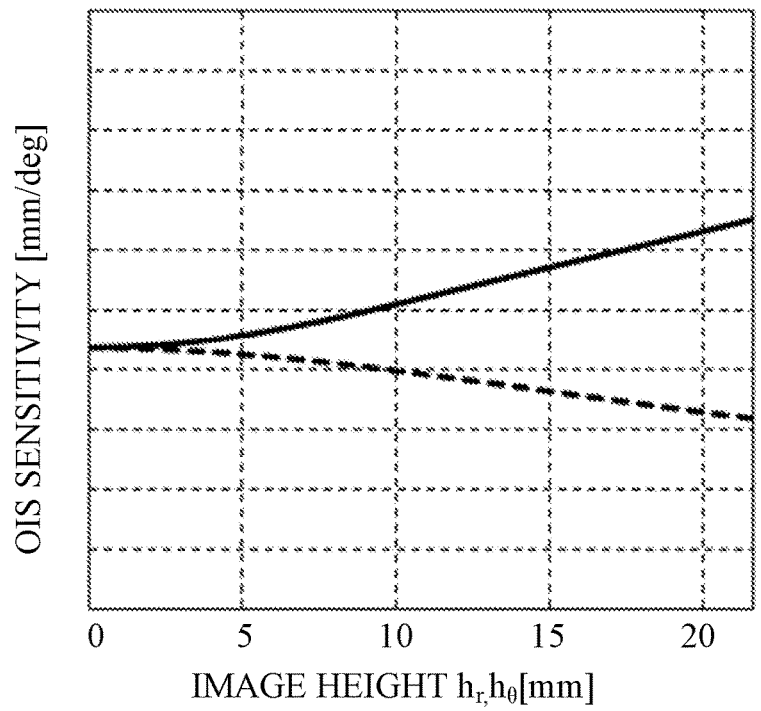
FIGS. 6A and 6B illustrate OIS sensitivity and IIS sensitivity in Example 1.
Figure 6B:
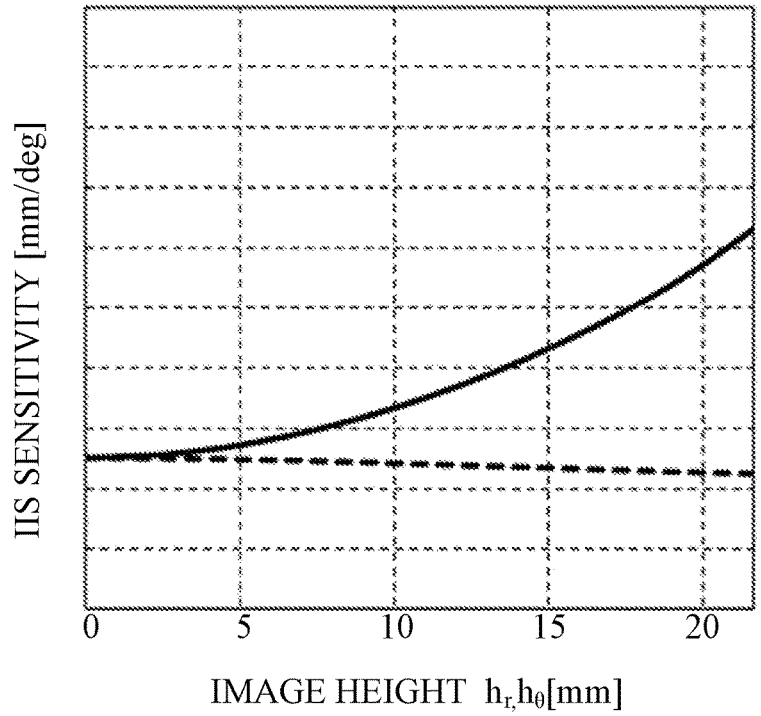

The image stabilization sensitivity for each of the image heights $h_r$ and $h_\theta$ is calculated as a value obtained by dividing the tilt-image shift sensitivity at the image height by the decentering-image shift sensitivity at the image height. FIG. 6A illustrates the OIS sensitivities (characteristics) for the image heights $h_r$ and $h_\theta$. FIG. 6B illustrates the IIS sensitivities (characteristics) for the image heights $h_r$ and $h_\theta$.

The OIS sensitivities for the image heights $h_r$ and $h_\theta$ are different from each other as illustrated in FIG. 6A, and thus necessary OIS drive amounts at the image heights in the first and second off-optical axis directions, respectively, in a case where angle shake has occurred are different from each other. This is because of the difference between the image point movement amounts (tilt-image shift sensitivities) at the respective image heights due to image deformation (trapezoid distortion) at the angle shake occurrence, and the difference between the image point movement amounts (OIS decentering-image shift sensitivities) at the respective image heights due to image deformation (decentering distortion) at decentering of the OIS optical system 1014.

The OIS sensitivities for the image heights $h_r$ and $h_\theta$ are different from each other as illustrated in FIG. 6B, and thus necessary IIS drive amounts at the image heights in the first and second off-optical axis directions, respectively, in a case where angle shake has occurred are different from each other. This is because of the difference between the image point movement amounts (tilt-image shift sensitivities) at the respective image heights due to image deformation (trapezoid distortion) at the angle shake occurrence.

Comparison between FIGS. 6A and 6B indicates that the OIS sensitivity and the IIS sensitivity for each of the image heights $h_r$ and $h_\theta$ are different from each other. In this manner, it is possible to excellently correct image blurs at the image central part and reduce the image blur residue amounts of the image peripheral part by cooperatively controlling, at an optimum control ratio, two image stabilization units having image stabilization sensitivities different from each other. The optimum control ratio of OIS and IIS can be derived by using the image blur residue amounts of the image peripheral part, which can be calculated from the OIS and IIS image shift sensitivities (tilt-image shift sensitivity and decentering-image shift sensitivity).

Optimum Control Ratio

The image blur residue amount at the image peripheral part in a case where image blurs at the image central part are corrected needs to be understood to derive the control ratio of OIS and IIS. The image blur residue amount can be calculated from tilt-image shift sensitivity of the image pickup optical system 101 and the decentering-image shift sensitivities (OIS decentering-image shift sensitivity and IIS decentering-image shift sensitivity) of each blur correction mechanism, which are information about image shift sensitivity. The image blur residue amounts in the first and second off-optical axis directions in a case where image blurs at the image central part are corrected with OIS alone upon occurrence of angle shake of a shake angle $\Delta\omega$ are represented by $v_{OIS\_r}$ and $v_{OIS\_\theta}$, respectively. In addition, the image blur residue amounts in the first and second off-optical axis directions in a case where image blurs at the image central part are corrected with IIS alone are represented by $v_{IIS\_r}$ and $v_{IIS\_\theta}$, respectively. The image blur residue amounts at the respective image heights are provided by equations (3) to (6) below.

$$v_{OIS\_r}(h_r) = \Delta\omega \times LS\_r(h_r) - \Delta\omega \times LS\_r(0)/TS\_r(0) \times TS\_r(h_r) \quad (3)$$

$$v_{OIS\_\theta}(h_\theta) = \Delta\omega \times LS\_\theta(h_\theta) - \Delta\omega \times LS\_\theta(0)/TS\_\theta(0) \times TS\_\theta(h_\theta) \quad (4)$$

$$v_{IIS\_r}(h_r) = \Delta\omega \times LS\_r(h_r) - \Delta\omega \times LS\_r(0) \quad (5)$$

$$v_{IIS\_\theta}(h_\theta) = \Delta\omega \times LS\_\theta(h_\theta) - \Delta\omega \times LS\_\theta(0) \quad (6)$$

Among the signs of the image blur residue amounts $v_{OIS\_r}$, $v_{OIS\_\theta}$, $v_{IIS\_r}$, and $v_{IIS\_\theta}$ that are expressed in the above-described equations, a positive sign means a residue amount due to insufficient correction, and a negative sign means a residue amount due to excessive correction. Insufficient correction means that the image point movement amount in a direction in which the image point movement amount due to angle shake is canceled by image stabilization is smaller than the image point movement amount due to angle shake. Excessive correction means that the image point movement amount in a direction in which the image point movement amount due to angle shake is canceled by image stabilization is larger than the image point movement amount due to angle shake.

In the control ratio of OIS and IIS, the control proportion of OIS (hereinafter referred to as OIS proportion) is represented by $\alpha$, the control proportion of IIS (hereinafter referred to as IIS proportion) is represented by $\beta$, and the control ratio of OIS and IIS (hereinafter referred to as OIS-IIS ratio) is expressed as $\alpha:\beta$. The OIS proportion or the IIS proportion is set to be one in a case where correction of image blurs at the image central part is performed with one of OIS and IIS alone.

The image blur residue amounts v at respective image heights are provided in equations (7) to (9) below by using equations (4) to (6).

$$\alpha + \beta = 1 \quad (7)$$

$$v\_r(h_r) = v_{OIS\_r}(h_r) \times \alpha + v_{IIS\_r}(h_r) \times \beta \quad (8)$$

$$= \Delta\omega \times LS(h_r) - \Delta\omega \times LS(0) \times \{\alpha \times TS(h_r)/TS(0) + \beta\}$$

$$v\_\theta(h_\theta) = v_{OIS\_\theta}(h_\theta) \times \alpha + v_{IIS\_\theta}(h_\theta) \times \beta \quad (9)$$

$$= \Delta\omega \times LS(h_\theta) - \Delta\omega \times LS(0) \times \{\alpha \times TS(h_\theta)/TS(0) + \beta\}$$

Equation (7) is provided as a constraint condition for performing correction of image blurs at the image central part. Thus, in order to reduce the image blur residue amounts of the image peripheral part, it is needed to calculate the OIS-IIS control ratio of $\alpha:\beta$ with which the image blur residue amounts $v\_r(h_r)$ and $v\_\theta(h_\theta)$ expressed in equations (8) and (9) decrease while the constraint of equation (7) is satisfied.

FIGS. 7A to 7D illustrate the image blur residue amounts $v\_r(h_r)$ and $v\_\theta(h_\theta)$ for each image height in the first and second off-optical axis directions from the optical axis position O with different OIS-IIS control ratios of $\alpha:\beta$. The horizontal axis represents the image heights $h_r$ and $h_\theta$, and the vertical axis represents the image blur residue amounts $v\_r(=v_{OIS\_r}$ or $v_{IIS\_r})$ and $v\_\theta(=v_{OIS\_\theta}$ or $v_{IIS\_\theta})$.

Figure 7A:
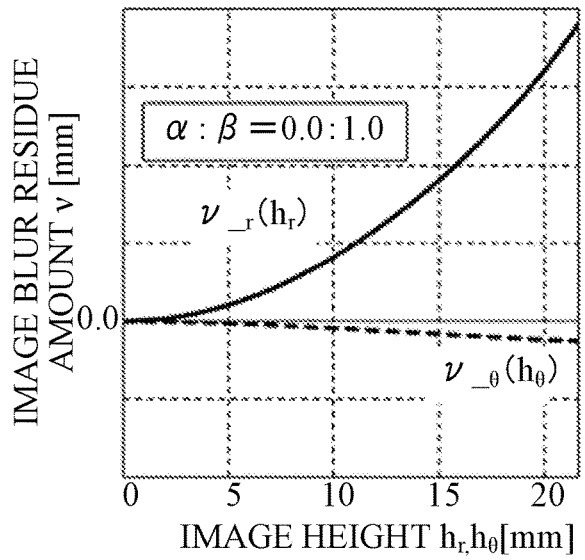
FIGS. 7A, 7B, 7C, and 7D illustrate image blur residue amounts at image stabilization with IIS alone and image stabilization with OIS alone and image blur residue amounts at image stabilization with OIS and IIS in Example 1.
Figure 7B:
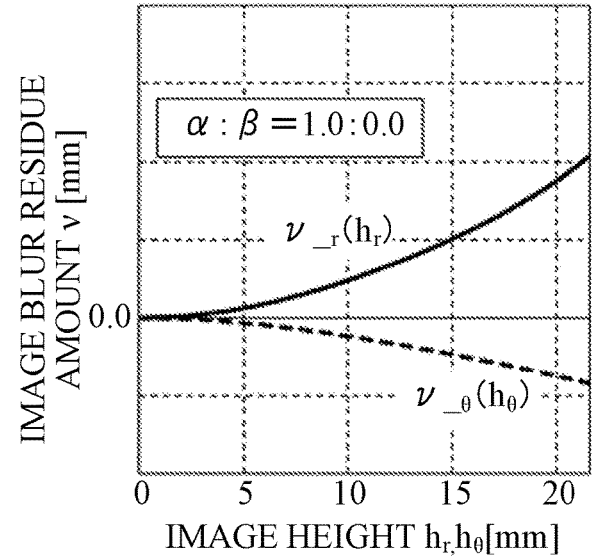

FIG. 7A illustrates a case where image stabilization is performed with $\alpha:\beta=0.0:1.0$, in other words, IIS alone. The vertical axis represents $v\_r=v_{II\_r}$ and $v\_\theta=v_{IIS\_\theta}$. FIG. 7B illustrates a case where image stabilization is performed with $\alpha:\beta=1.0:0.0$, in other words, OIS alone. The vertical axis represents $v\_r=v_{OIS\_r}$ and $v\_\theta=v_{OIS\_\theta}$.

Figure 7C:
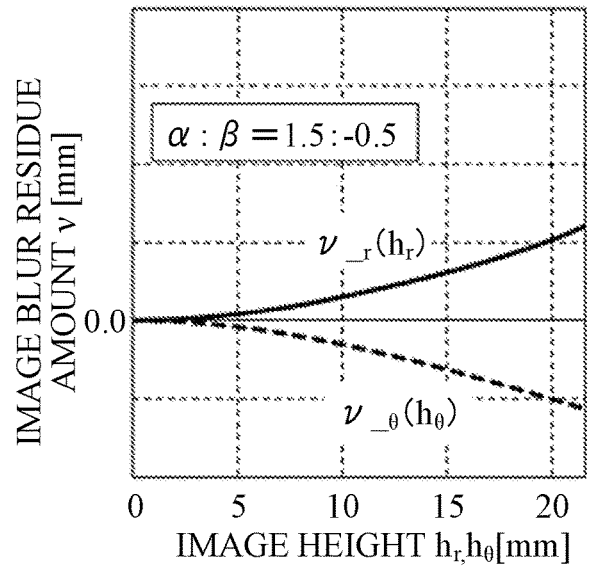

FIG. 7C illustrates a case where image stabilization is performed with $\alpha:\beta=1.5:-0.5$. The OIS-IIS ratio of $\alpha:\beta$ is determined such that the image blur residue amounts near the image height of 18 mm at the image peripheral part in the first and second off-optical axis directions decrease and become equal to each other $(v\_r(h_r=18)+v\_\theta(h_\theta=18)=0$ on image shift sensitivity). In other words, the OIS-IIS ratio of $\alpha:\beta$ is determined to minimize the difference between the absolute values of the image blur residue amounts near the image height of 18 mm in the first and second off-optical axis directions:

$$|v\_r(h_r=18)|-|v\_\theta(h_\theta=18)|$$

Figure 7D:
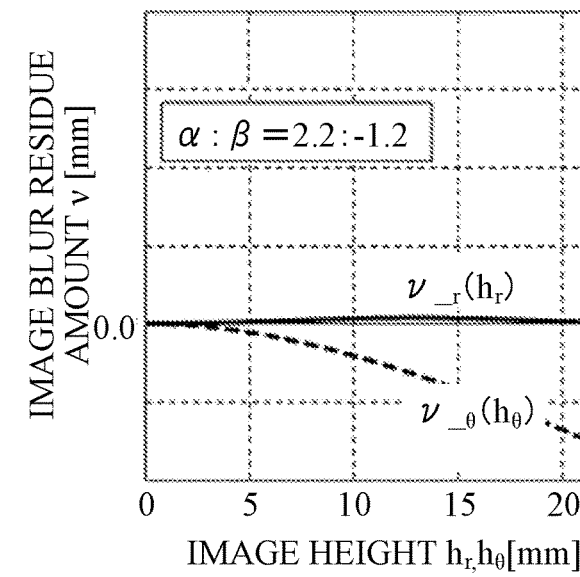

FIG. 7D illustrates a case where image stabilization is performed with $\alpha:\beta=2.2:-1.2$. The OIS-IIS ratio $(\alpha:\beta)$ is determined such that the image blur residue amounts near the image height of 18 mm in the first off-optical axis direction are zero $(v\_r(h_r=18)=0)$. In other words, the OIS-IIS ratio $(\alpha:\beta)$ is determined to minimize the sum of the absolute values of the image blur residue amounts near the image height of 18 mm in the first and second off-optical axis directions:

$$|v\_r(h_r=18)|+|v\_\theta(h_\theta=18)|$$

A case where $\alpha$ or $\beta$ illustrated in FIGS. 7C and 7D is equal to or larger than one means that the OIS drive amount or the IIS drive amount is larger than in a case where correction of image blurs at the image central part is performed with OIS or IIS alone. A case where $\alpha$ or $\beta$ is negative means that OIS or IIS is driven in a direction opposite the direction in a case where correction of image blurs at the image central part is performed with OIS or IIS alone. In this example, setting the OIS proportion $\alpha$ to be larger than one means that image deformation occurring as trapezoid distortion in a case where angle shake has occurred is canceled by image deformation due to decentering distortion with OIS. Setting the IIS proportion $\beta$ to be negative means that an amount by which image points at the image central part move beyond the image point movement amount due to angle shake in a case where OIS is driven with α>1 is canceled with IIS to align the center of the object image in the image pickup optical system 101 and the center of the imaging surface of the image sensor 201.

As for the image blur residue amount $v_{-r}(h_r)$ in the first off-optical axis direction, it is understood that the image blur residue amount of the image peripheral part is further reduced in a case where OIS is more largely driven than IIS as illustrated in FIGS. 7C and 7D than in a case where image stabilization is performed with IIS alone as illustrated in FIG. 7A and in a case where image stabilization is performed with OIS alone as illustrated in FIG. 7B. However, as the OIS proportion increases, the image blur residue amount $v_{-\theta}(h_\theta)$ in the second off-optical axis direction increases toward the excessive correction side for any image height. This is because image deformation by trapezoid distortion that occurs due to angle shake and image deformation by decentering distortion that occurs due to OIS are not similar to each other in shape and cannot be completely canceled by each other.

Thus, α and β with which an image blur residue at the image peripheral part can be effectively reduced by cooperative control of OIS and IIS in this example may be values in ranges below. For α and β, the image blur residue amount $v_{-r}(h_r)$ at the image height in the first off-optical axis direction may be smaller than the image blur residue amount $v_{OIS\_r}(h_r)$ at image stabilization with OIS alone as illustrated in FIG. 7B. Moreover, α and β may be in ranges with which the image blur residue amount $v_{-\theta}(h_\theta)$ at the image height in the second off-optical axis direction is not larger than the image blur residue amount $v_{-\theta}(h_\theta)$ illustrated in FIG. 7D. Specifically, the following inequalities may be satisfied:

$$1.0 < \alpha \leq 2.2 \tag{10}$$

$$-1.2 \leq \beta < 0.0 \tag{11}$$

Image blur correction that effectively reduces the image blur residue amounts of the image peripheral part can be achieved by determining the OIS drive amount and the IIS drive amount for the OIS-IIS ratio of α:β satisfying the inequalities.

The optimum OIS-IIS ratio of α:β is different in accordance with the focal length of the image pickup optical system 101, which is changed by zooming, and the in-focus object distance thereof changed by focusing. Thus, in this example, table data of the optimum OIS-IIS ratio that is different for each focal length and each in-focus object distance of the image pickup optical system 101 is stored in the lens memory 106 as the information about IS control. Accordingly, image stabilization that effectively reduces the image blur residue amounts of the image peripheral part can be achieved in any image pickup state in a range from a wide-angle end at the maximum image pickup view angle to a telephoto end at the minimum image pickup view angle and from in-focus at infinity to in-focus at the closest distance.

However, the OIS-IIS ratio in this case does not necessarily need to be directly calculated from designed values. For example, information such as the tilt-image shift sensitivities and the decentering-image shift sensitivities described above may be stored in the lens memory 106 as information about IS control, and the OIS-IIS ratio may be calculated in the lens microcomputer 102 or the camera microcomputer 202.

The image blur residue amount at the image height of 18 mm is used in a case where the OIS-IIS ratio is set in this example, but the image blur residue amount at an image height other than 18 mm, for example, at a lower image height such as 12 mm or 15 mm may be used. Moreover, the OIS-IIS ratio may be set based on, for example, the average value of the image blur residue amount in an optional image height range.

In this example, the optimum OIS-IIS ratio is obtained by calculating the image blur residue amounts $v_{-r}(h_r)$ and $v_{-\theta}(h_\theta)$ in the first and second off-optical axis directions from the tilt-image shift sensitivities and the decentering-image shift sensitivities, which are designed values of the image pickup optical system 101. However, the OIS-IIS ratio may be obtained while the image blur residue amounts are checked by measurement. For example, after the image pickup system squarely facing a point image chart is tilted by an optional angle, the OIS drive amount and the IIS drive amount are adjusted so that an image point at the image central part moved in accordance with the tilt amount returns to its position in the squarely facing state. Then, the image blur residue amounts at the image heights in the first and second off-optical axis directions are checked based on the amount of movement from the image point in the squarely facing state. Accordingly, the OIS-IIS ratio derived so that the amount of movement decreases may be used.

Influence of shift shake of the image pickup system on image blur becomes large as the in-focus object distance approaches its closest distance. Thus, to separately handle the influence of shift shake separately from angle shake, the OIS-IIS ratio may be set by using, separately from the tilt-image shift sensitivities, image shift sensitivity for the decentering amount of the entire image pickup optical system. In this case, image blur amounts at the image heights in the first and second off-optical axis directions for each of angle shake detected by using a gyro sensor and shift shake detected by using an acceleration sensor can be calculated. Thus, the OIS-IIS ratio with which the image blur residue amounts of the image peripheral part can be effectively reduced can be calculated by using the calculated image blur amounts and the decentering-image shift sensitivities. Accordingly, image stabilization that more effectively reduces the image blur residue amounts of the image peripheral part can be achieved in a case of in-focus at a close end as well.

In this example, image stabilization is performed by using OIS and IIS with image stabilization sensitivities different from each other, but two OIS with image stabilization sensitivities different from each other may be used. Moreover, electronic image stabilization that shifts an effective pixel area on the image sensor (cutout area in an image generated by the image sensor) may be used in place of IIS. The number of image stabilization units with image stabilization sensitivities different from one another is not limited to two but may be equal to or larger than three.

Effects of Optimum OIS-IIS Ratio

The following describes the relation between the image blur residue amounts $v_{-r}(h_r)$ and $v_{-\theta}(h_\theta)$ of the image peripheral part in the first and second off-optical axis directions from the optical axis position O, and blur images remaining at the image central part on the actual imaging surface in a case where the optimum OIS-IIS ratio is used.

Figure 8A:
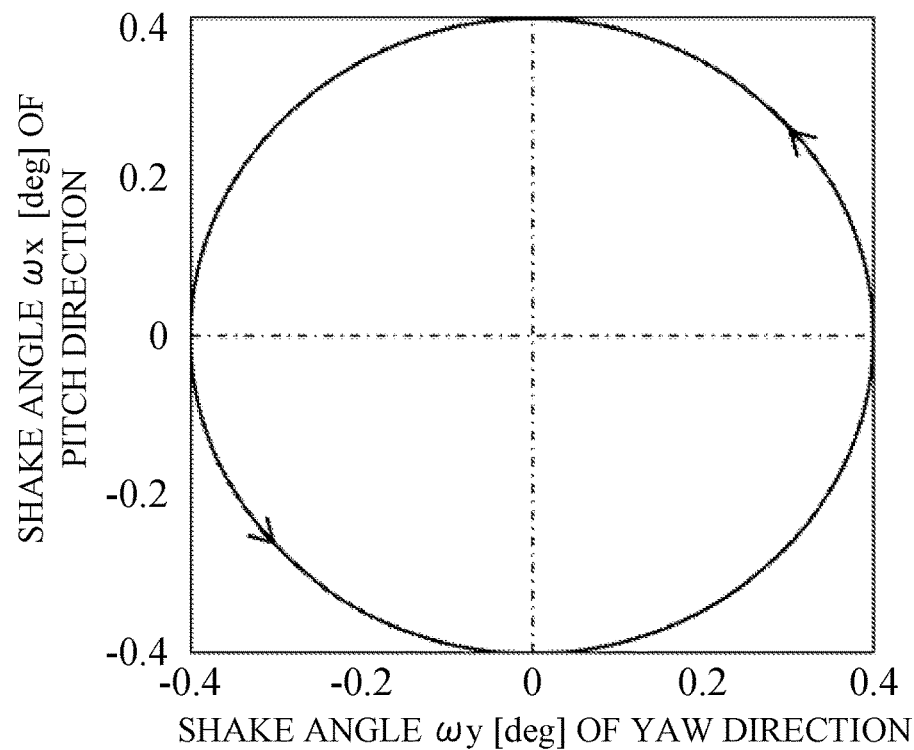
FIGS. 8A and 8B illustrate the waveform of angle shake and a blurred image.

FIG. 8A illustrates the waveform of angle shake virtually provided to the image pickup system. The horizontal axis represents an shake angle $\omega_y$ about the Y axis on the imaging surface, and the vertical axis represents a shake angle $\omega_x$ about the X axis. In this example, $(\omega_y, \omega_x)=(0, 0)$ corresponds to a state in which the image pickup system squarely faces the object, and with the angle shake, the image pickup system is rotated once about the optical axis while being constantly tilted by 0.4°.

Figure 8B:
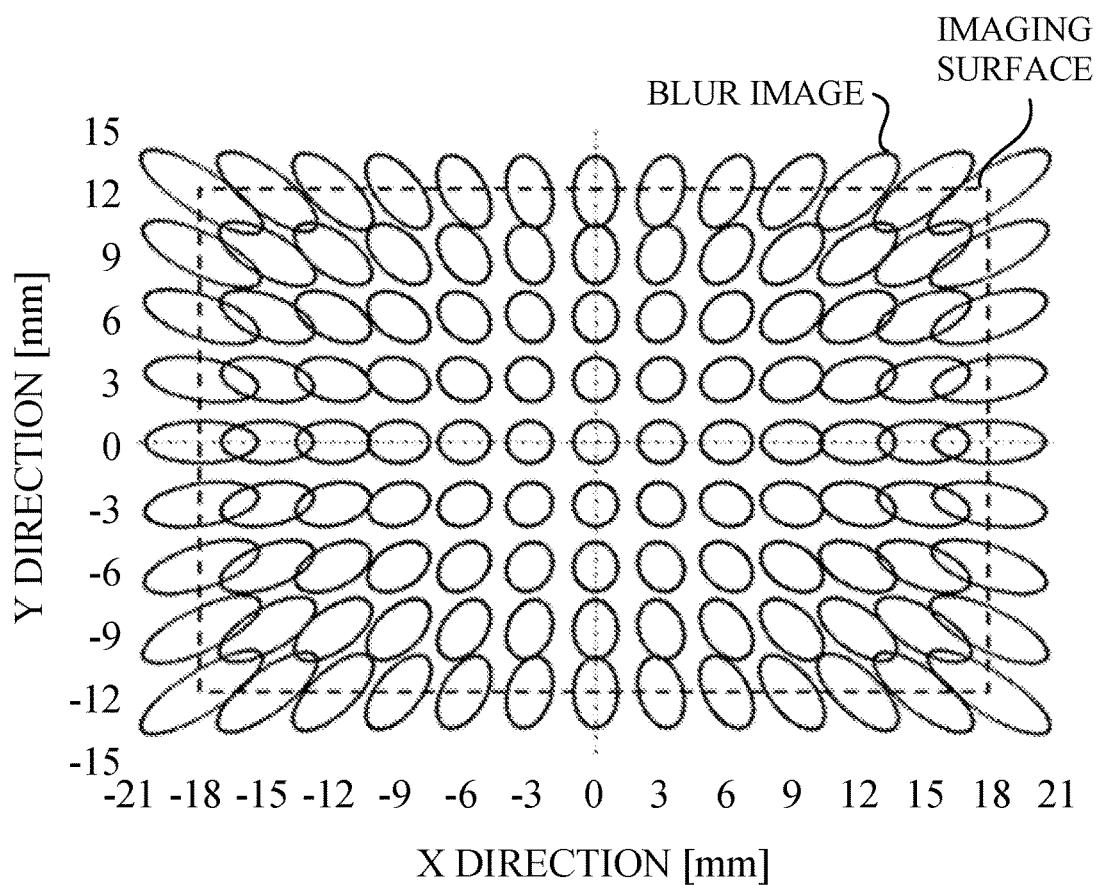

FIG. 8B illustrates, in a manner exaggerated 10 times approximately, blur images formed on the imaging surface in the image pickup system to which the angle shake illustrated in FIG. 8A is applied. Blur images in similar shapes to the waveform of the angle shake are formed at the image central part. However, blur images in elliptical shapes extending longer in the radial direction at positions closer to the peripheral side are formed in the image peripheral part. This is a result of deformation of blur images into elliptical shapes due to image deformation by trapezoid distortion.

Figure 9A:
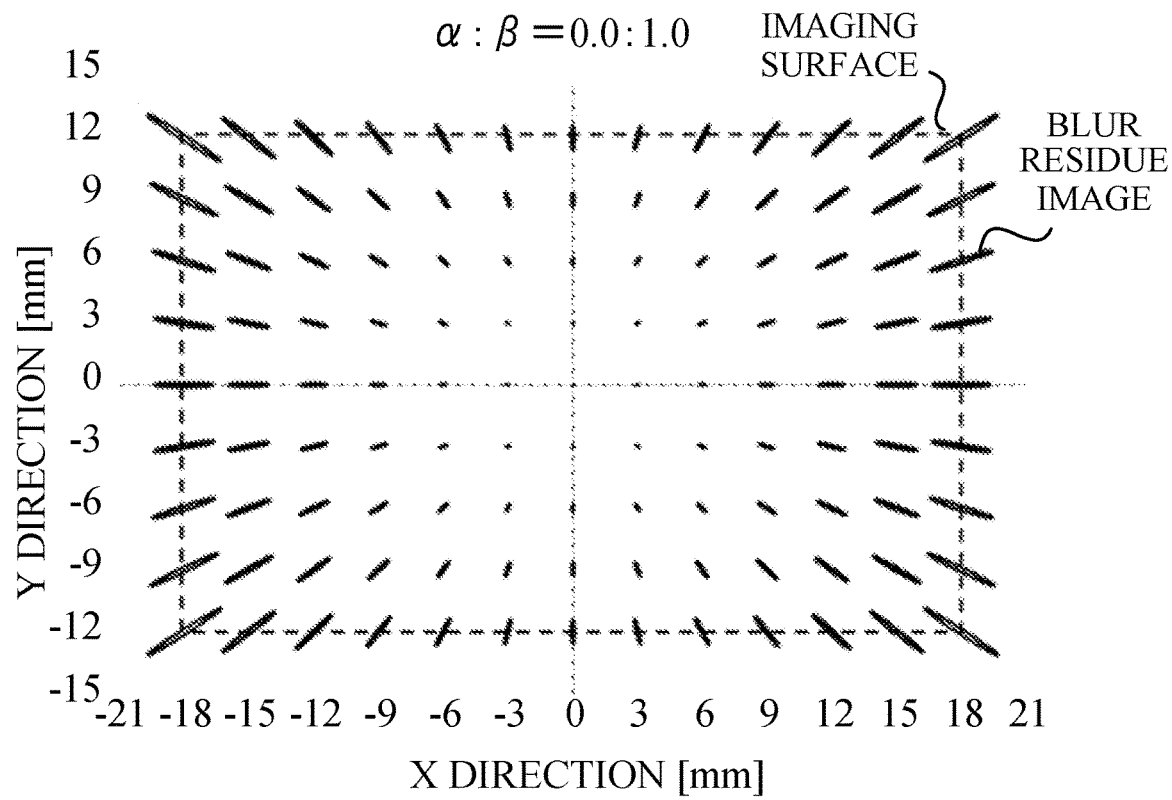
FIGS. 9A and 9B illustrate image blur residue images at image stabilization with IIS alone and with OIS alone.
Figure 9B:
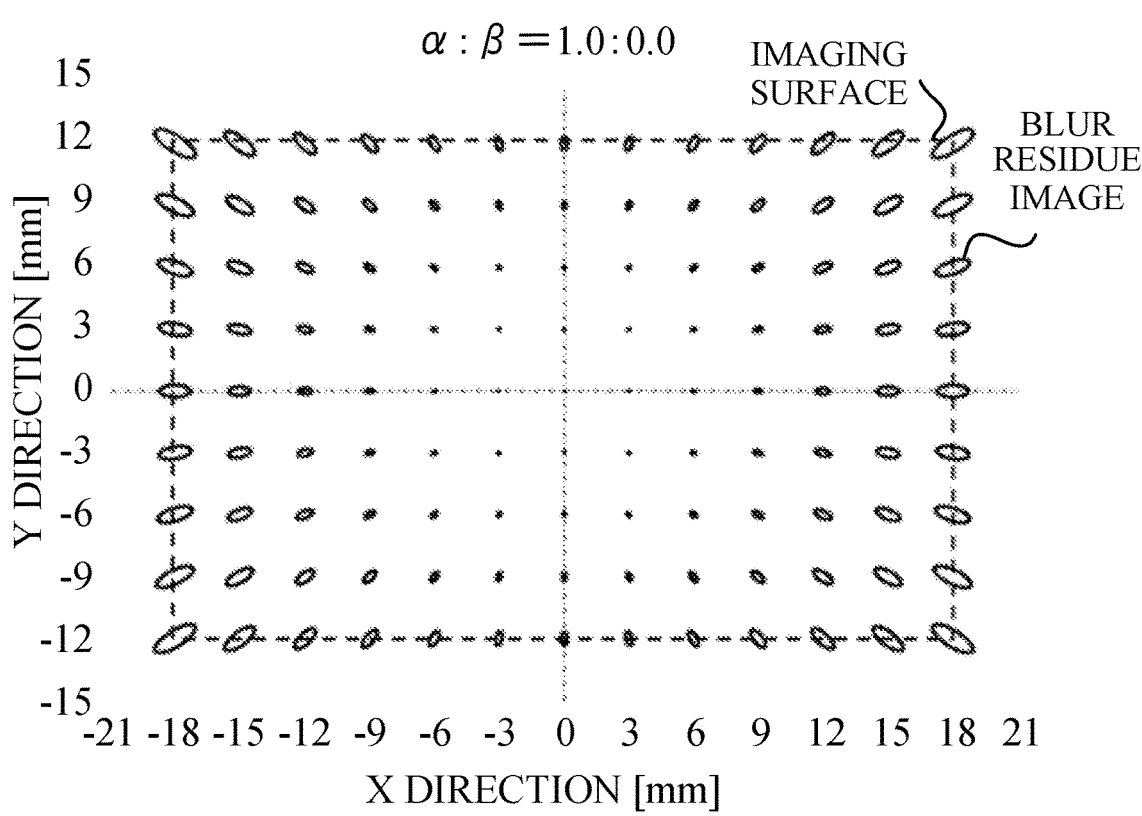
Figure 10A:
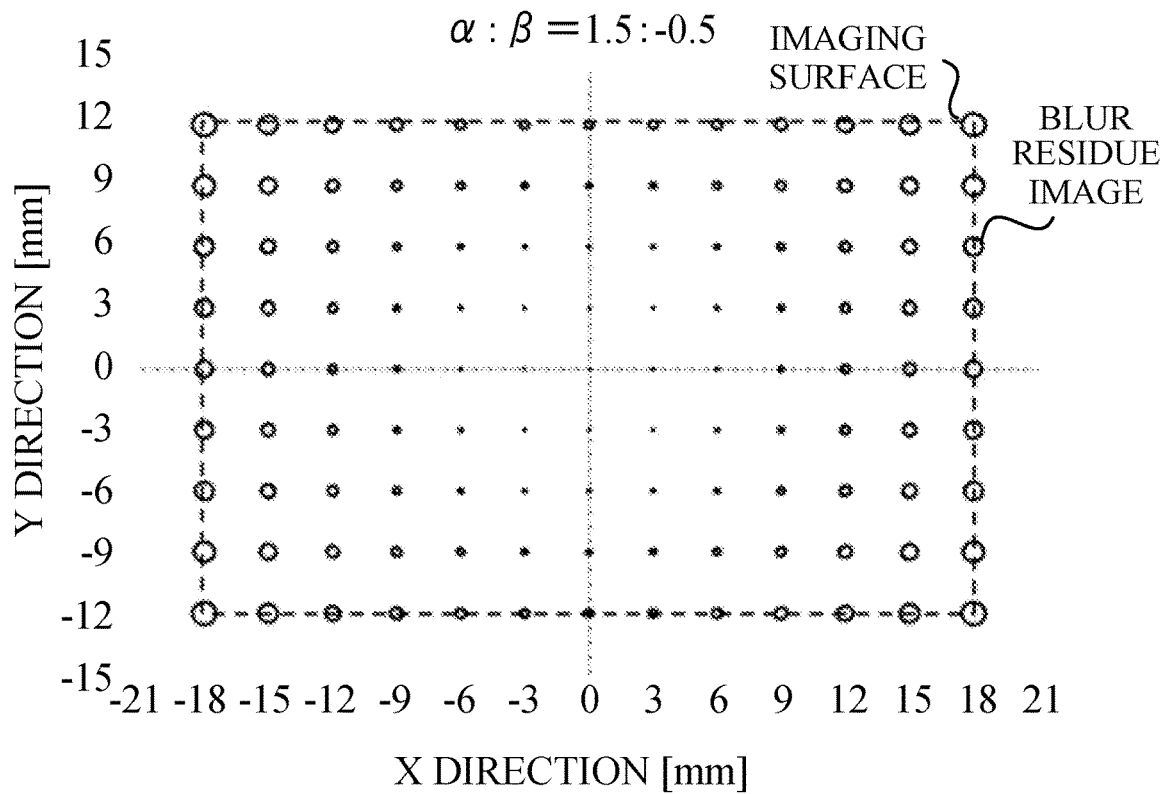
FIGS. 10A and 10B illustrate blur residue images at image stabilization with OIS and IIS in Example 1.
Figure 10B:
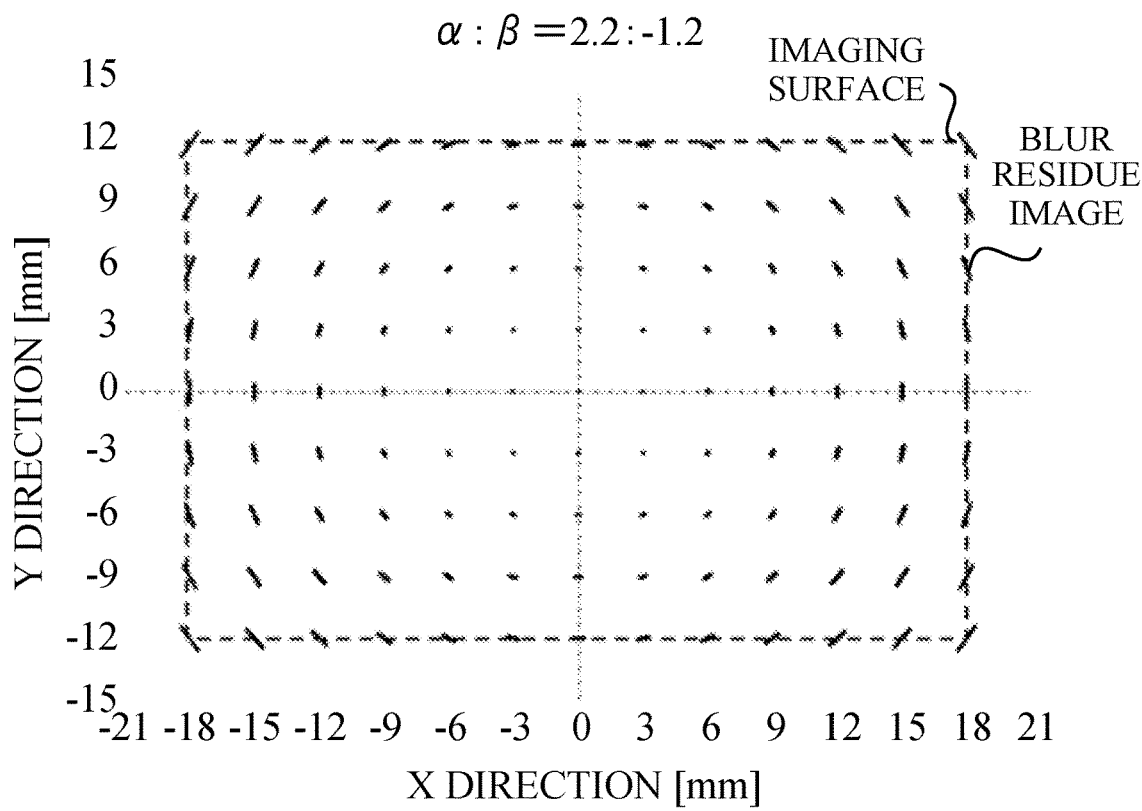

FIGS. 9A, 9B, 10A, and 10B illustrate, in a manner exaggerated 10 times approximately, blur images (hereinafter referred to as blur residue images) remaining at the image peripheral part in a case where control is performed so that image blurs at the image central part due to the angle shake in FIG. 8A are corrected with the OIS-IIS ratio of $\alpha:\beta$ described below. FIG. 9A illustrates a case where control is performed with $\alpha:\beta=0.0:1.0$ (in other words, with IIS alone), and FIG. 9B illustrates a case where control is performed with $\alpha:\beta=1.0:0.0$ (in other words, with OIS alone). FIG. 10A illustrates a case where control is performed with $\alpha:\beta=1.5:-0.5$, and FIG. 10B illustrates a case where control is performed with $\alpha:\beta=2.2:-1.2$. The coordinate (0, 0) illustrated in these diagrams is the optical axis position O on the imaging surface, and an image height h is the distance to an image point separated from the optical axis position O on the imaging surface.

In FIGS. 9A and 9B, images appear as points at the image central part near the optical axis position O, and thus it is understood that image blurs at the image central part are excellently corrected. However, elliptical blur residue images are larger in the radial direction as the image height h is higher. When image stabilization is performed for actual irregular angle shake, the locus of the irregular angle shake is projected and remains in the elliptical shapes of blur residue images. For example, in a case where image stabilization is performed for angle shake with a shake locus along which the shake angles change within 0.4° (inside the circle in FIG. 8A), blur residue images become such images that the shake locus is projected in the elliptical shapes illustrated in FIGS. 9A and 9B.

The radial length of an elliptical blur residue image at each image height at the image peripheral part in FIG. 9A or 9B corresponds to the image blur residue amount $v_{-r}(h_r)$ in the first off-optical axis direction in FIG. 7A or 7B, respectively. Its length in a direction orthogonal to the radial direction corresponds to the image blur residue amount $v_{-\theta}(h_\theta)$ in the second off-optical axis direction in FIG. 7A or 7B, respectively. For each blur residue image, the image blur residue amounts $v_{-r}(h_r)$ and $v_{-\theta}(h_\theta)$ at the same image height indicate the size and ellipticity of the elliptical shape of the blur residue image. Thus, the size and shape of a blur residue image at each image point position can be controlled by controlling the image blur residue amounts $v_{-r}(h_r)$ and $v_{-\theta}(h_\theta)$ in the first and second off-optical axis directions. Accordingly, the sizes and appearances of blur residue images on the entire imaging surface can be controlled by setting the optimum OIS-IIS ratio of $\alpha:\beta$ with which the image blur residue amounts $v_{-r}(h_r)$ and $v_{-\theta}(h_\theta)$ can be controlled.

The radial length of a blur residue image at each image height at the image peripheral part in FIG. 10A or 10B corresponds to the image blur residue amount $v_{-r}(h_r)$ in the first off-optical axis direction in FIG. 7C or 7D, respectively. Its length in a direction orthogonal to the radial direction corresponds to the image blur residue amount $v_{-\theta}(h_\theta)$ in the second off-optical axis direction in FIG. 7C or 7D, respectively.

As illustrated in FIG. 10A, the size and ellipticity of each blur residue image can be reduced ($|v_{-r}(h_r)|=|v_{-\theta}(h_\theta)|$) by setting the OIS-IIS ratio of $\alpha:\beta$ so that image blur remains with $v_{-r}(h_r)+v_{-\theta}(h_\theta)=0$. Moreover, since the blur residue image approaches a circular shape, degradation of the appearance of a captured image due to the blur residue image can be reduced as well. When the OIS-IIS ratio of $\alpha:\beta$ is set to have $v_{-r}(h)=0$ at the image peripheral part as illustrated in FIG. 10B, the sum $|v_{-r}(h_r)|+|v_{-\theta}(h_\theta)|$ of the image blur residue amounts in the first and second off-optical axis directions is smallest. As a result, the effect of reducing the size of each blur residue image can be increased.

As described above, to further reduce the image blur residue amounts of the image peripheral part, the OIS-IIS ratio of $\alpha:\beta$ may be set between a ratio with which $|v_{-r}(h_r)|=|v_{-\theta}(h_\theta)|$ is obtained and a ratio with which $|v_{-r}(h_r)|+|v_{-\theta}(h_\theta)|$ is smallest. Specifically, the OIS-IIS ratio of $\alpha:\beta$ may be set so that the following inequalities are satisfied rather than the above-described case where inequalities (10) and (11) are satisfied:

$$1.5 \leq \alpha \leq 2.2 \tag{12}$$

$$-1.2 \leq \beta \leq 0.5 \tag{13}$$

This example describes the image pickup optical system for which the optimum OIS-IIS ratio has $\alpha>1$ and $\beta<0$. However, the optimum OIS-IIS ratio depends on image shift sensitivities (tilt-image shift sensitivities and decentering-image shift sensitivities) determined by specifications and designed values of the image pickup optical system and the OIS optical system. Thus, the OIS-IIS ratio may have $0<\alpha<1.0$ and $0<\beta<1.0$ with which correction of image blurs at the image central part is distributively performed by OIS and IIS. Alternatively, the OIS-IIS ratio may have $\alpha<0$ and $\beta>1$ with which OIS is driven in an direction opposite the usual direction to reduce image deformation and IIS is driven in a larger amount. These cases will be described as numerical examples later.

Example 2

This example describes proper OIS and IIS control in a case where image distortion due to distortion is corrected by image processing in an image pickup system using an image pickup optical system that allows occurrence of distortion. The description will be made only on difference from Example 1. This example is different from Example 1 in the method of calculating the image blur residue amount for each image height in a case where electronic distortion correction (hereinafter simply referred to as electronic correction) by image processing is performed. The configuration of the image pickup system in this example, the method of acquiring image shift sensitivities (tilt-image shift sensitivities and decentering-image shift sensitivities), and the method of calculating the optimum OIS-IIS ratio from the image blur residue amounts are the same as in Example 1.

Assume that barrel-type distortion (negative distortion) largely occurs to the image pickup optical system in this example. When an image blur residue amount is calculated for the image pickup optical system by using only designed values of tilt-image shift sensitivities and decentering-image shift sensitivities as described above in Example 1, the image blur residue amount $v_{-r}(h_r)$ in an apparent radial direction (first off-optical axis direction) in an image after electronic correction is larger than the calculated value. This is because consideration is not made on increment of the image point movement amount along with stretch of the image in the radial direction due to the electronic correction.

In a case where distortion due to distortion is corrected so that an image point at the image height h included in an object image formed through the image pickup optical system is positioned at the ideal image height h0, the ideal image height h0 for the image height h on the object image is expressed in equation (14) below from equations (1) and (2) expressing the distortion DIST.

$$h0 = h/(1+\text{DIST}(h)) \tag{14}$$

In a case where the image point position in the first off-optical axis direction is moved by Δh due to angle shake, an ideal image height h0' after the electronic correction on the object image after the image point movement is expressed in equation (15) below.

$$h0' = (h+\Delta h)/(1-\text{DIST}(h+\Delta h)) \tag{15}$$

Thus, an image point movement amount Δh0 in the first off-optical axis direction with distortion correction taken into account is approximately expressed in equation (16) below.

$$\Delta h0 = h0' - h0 = (h+\Delta h)/(1-\text{DIST}(h+\Delta h)) - h/(1+\text{DIST}(h)) \tag{16}$$
$$\cong \Delta h \times d(h0)/dh$$

In equation (16), d(h0)/dh means a value obtained by differentiating h0 with respect to h. In other words, d(h0)/dh is the image point movement amount Δh0 at the image height after the electronic correction for the minute image point movement amount Δh at the image height before the electronic correction. In this manner, in a case where the image blur residue amount in the image after the electronic correction is considered, the image point movement amount Δh0 generated by, for example, angle shake of the image pickup system is a value obtained by multiplying the image point movement amount Δh before the electronic correction by the differential value d(h0)/dh of the ideal image height h0. In other words, when multiplied by d(h0)/dh, the image blur residue amount $v_{-r}(h_r)$ in the first off-optical axis direction can be handled as an image blur residue amount with distortion correction taken into account. Thus, the optimum OIS-IIS ratio can be obtained from the image blur residue amount $v_{-r}(h_r)$ in the first off-optical axis direction with distortion correction taken into account and the above-described image blur residue amount $v_{-\theta}(h_\theta)$ in the second off-optical axis direction, and as a result, blur correction that effectively reduces the image blur residue amounts of the image peripheral part can be achieved.

In this example, d(h0)/dh is substituted by a correction coefficient Δh0/Δh(h_r) that is the ratio of the image point movement amount Δh0 after the electronic correction relative to the image point movement amount Δh=0.1 mm before the electronic correction. The OIS-IIS ratio corresponding to increment of the image blur residue amount due to the electronic correction can be set by multiplying, for each image height, the image blur residue amount $v_{-r}(h_r)$ at the image height $h_r$ in the first off-optical axis direction by the correction coefficient Δh0/Δh(h_r). In other words, Δh0/Δh(h_r) is a correction coefficient for the image point movement amount for correcting the image blur residue amount at the image height in the first off-optical axis direction.

In this example, the correction coefficient Δh0/Δh(h_r) of the image point movement amount is calculated as the ratio of the image point movement amount Δh0 at the image height after the electronic correction relative to the image point movement amount Δh=0.1 mm before the electronic correction. However, the image point movement amount Δh before the electronic correction may be a value other than 0.1 mm. Moreover, the correction coefficient may be calculated as the ratio of the image point movement amount Δh before the electronic correction relative to the image point movement amount Δh0 after the electronic correction.

In a case where the OIS-IIS ratio is acquired by using a point image chart, the image point movement amount with distortion correction taken into account can be monitored by constantly applying electronic correction that corrects distortion to a captured image acquired by image capturing using the image pickup system. As a result, the same effects as those of this example can be obtained.

Figure 11:
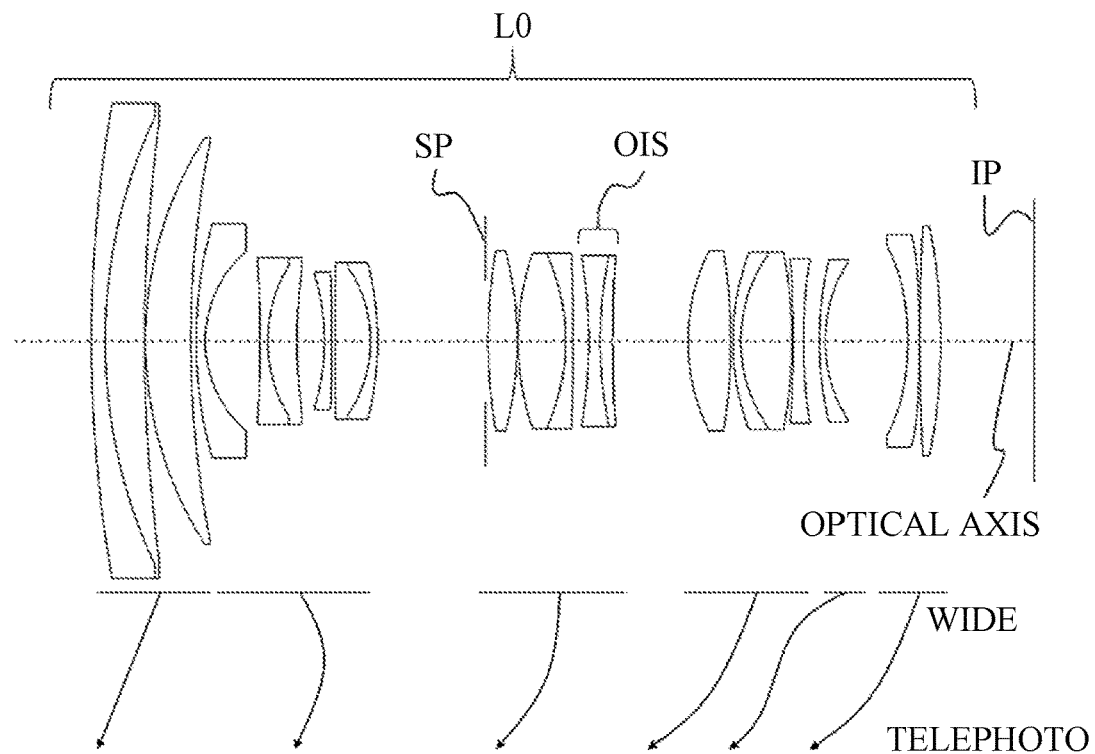
FIG. 11 is a sectional view of an optical system according to Numerical Example 1.
Figure 13:
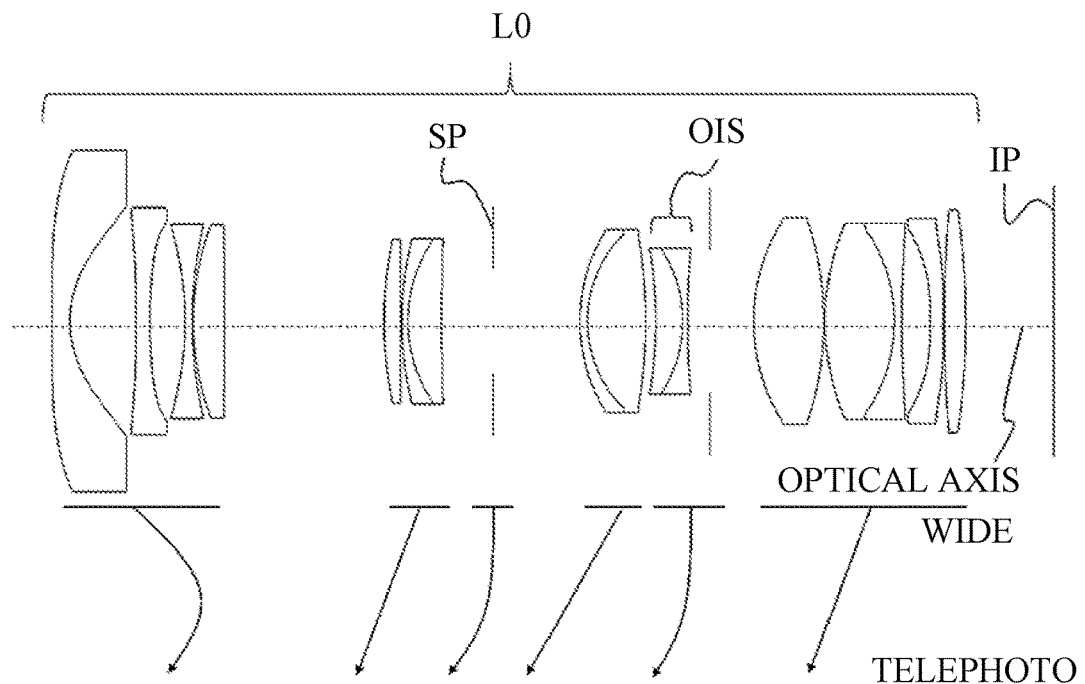
FIG. 13 is a sectional view of an optical system according to Numerical Example 2.
Figure 15:
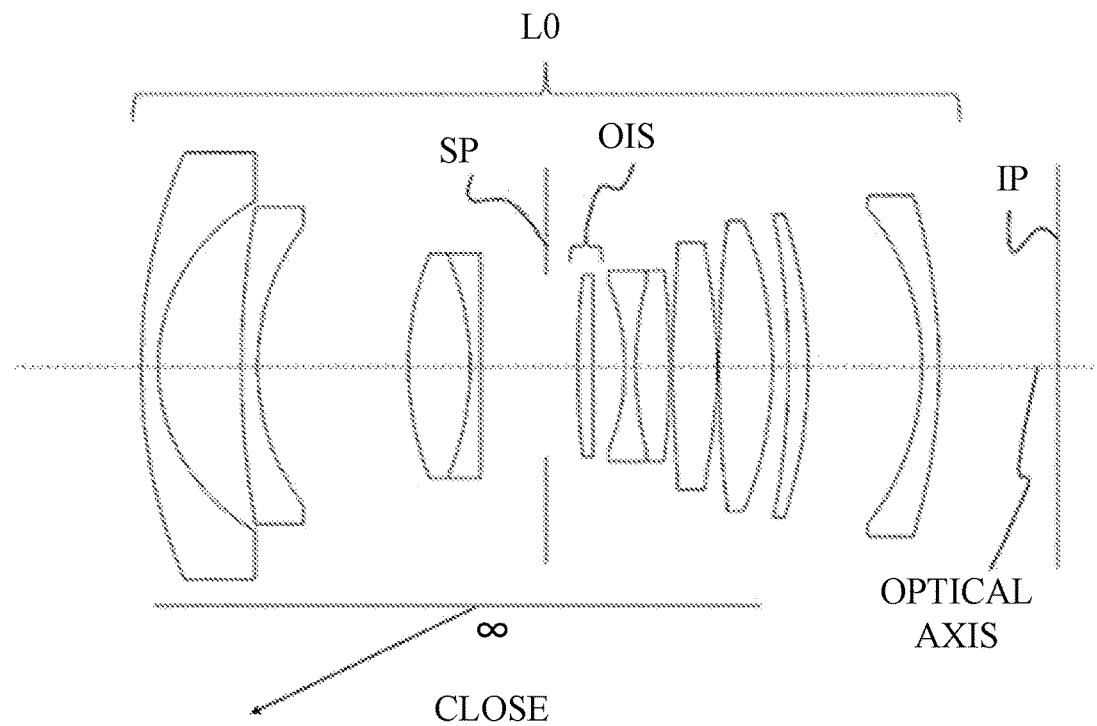
FIG. 15 is a sectional view of an optical system according to Numerical Example 3.

The following describes specific configuration examples (numerical examples) of the image pickup optical system 101 of the image pickup system in each according to Examples 1 and 2. FIGS. 11 and 13 illustrate the configuration of an optical system L0 as the image pickup optical system in a state of in-focus on an infinity object at the wide-angle end in Numerical Examples 1 and 2, respectively. Arrows illustrated in these diagrams indicate movement loci of lens groups upon zooming from the wide-angle end to the telephoto end. FIG. 15 illustrates the configuration of the optical system L0 according to Numerical Example 3 in a state of in-focus on an infinity object. Arrows illustrated in this diagram indicate movement loci of lens groups upon focusing on a short-distance object from an infinity object. The optical system L0 of each numerical example is used in various image pickup apparatuses such as a digital video camera, a digital still camera, a broadcasting camera, a monitoring camera, and a smartphone camera.

In each drawing, an object side is on the left side, and an image side is on the right side. Each optical system L0 is constituted by a plurality of lens groups and an aperture stop SP. A lens group is a group of one or a plurality of lenses that integrally move or stop at zooming, focusing, and blur correction. The interval between adjacent lens groups changes at zooming and focusing. The aperture stop may be included in a lens group.

IP denotes an image plane. The imaging surface of the image sensor 201 is disposed at the image plane IP. The OIS optical system is decentered (shifted) with respect to the optical axis of the optical system L0 in a case where OIS is performed.

Various numerical values according to Numerical Examples 1, 2, and 3 will be listed below. In surface data of each numerical example, a surface number i is the order of an optical surface counted from the object side, r (mm) represents the curvature radius of each optical surface, and d (mm) represents the interval (lens thickness or air interval) between the i-th and (i+1)-th surfaces on the optical axis. In addition, nd represents the refractive index of an optical material between the i-th and (i+1)-th surfaces at the d line, and νd represents the Abbe number of the optical member at the d line. The Abbe number νd is expressed in:

$$vd = (Nd-1)/(NF-NC)$$

where Nd, NF, and NC represent refractive indices at the d line (wavelength 587.6 nm), the F line (wavelength 486.1 nm), and the C line (wavelength 656.3 nm) in the Fraunhofer line.

In each numerical example, the interval d, the focal length (mm), the F number, and the half angle of view (°) are values in a case where the optical system L0 is in-focus on an object at infinity. Back focus (BF) is an air conversion length (mm) of the distance on the optical axis from a lens surface (final lens surface) closest to the image side to a paraxial image plane. The overall optical length is the summed length (mm) of the back focus and the distance on the optical axis from a lens surface (foremost lens surface) closes to the object side to the final lens surface.

The symbol * provided on the right side of a surface number indicates that the corresponding optical surface is an aspherical surface. An aspherical surface shape is expressed with:

$$x=(h^2/R)/[1+\{1-(1+k)(h/R)^2\}^{1/2}]+A4\times h^4+A6\times h^6+A8\times h^8+A10\times h^{10}+A12\times h^{12}+A14\times h^{14}+A16\times h^{16}$$

where x represents the amount of displacement from a surface apex in the optical axis direction, h represents the height from the optical axis in the direction orthogonal to the optical axis, R represents a paraxial curvature radius, k represents a conic constant, and A4, A6, A8, A10, and A12 represent aspherical surface coefficients of respective orders. In aspherical surface coefficient, "e±M" means "×$10^{\pm M}$".

Numerical Examples 1 and 2 list the image point movement amount at the shake angle of 0.5°, the tilt-image shift sensitivity, the image point movement amount after image stabilization, and the OIS decentering-image shift sensitivity for each image height in the first and second off-optical axis directions at the wide-angle end, the middle zoom position, and the telephoto end. Numerical Example 3 lists the image point movement amount at the shake angle of 0.5°, the tilt-image shift sensitivity, the image point movement amount after image stabilization, and the OIS decentering-image shift sensitivity for each image height in the first and second off-optical axis directions in a state of in-focus on an infinity object. Numerical Example 3 is the optical system L0 that expects electronic correction of a relatively large distortion amount, and thus Table 3 includes the correction coefficient of the image point movement amount for the image height in the first off-optical axis direction.

Methods of deriving the tilt-image shift sensitivity and the OIS decentering-image shift sensitivity will be described below with respect to FIGS. 17A and 17B.

Figure 17A:
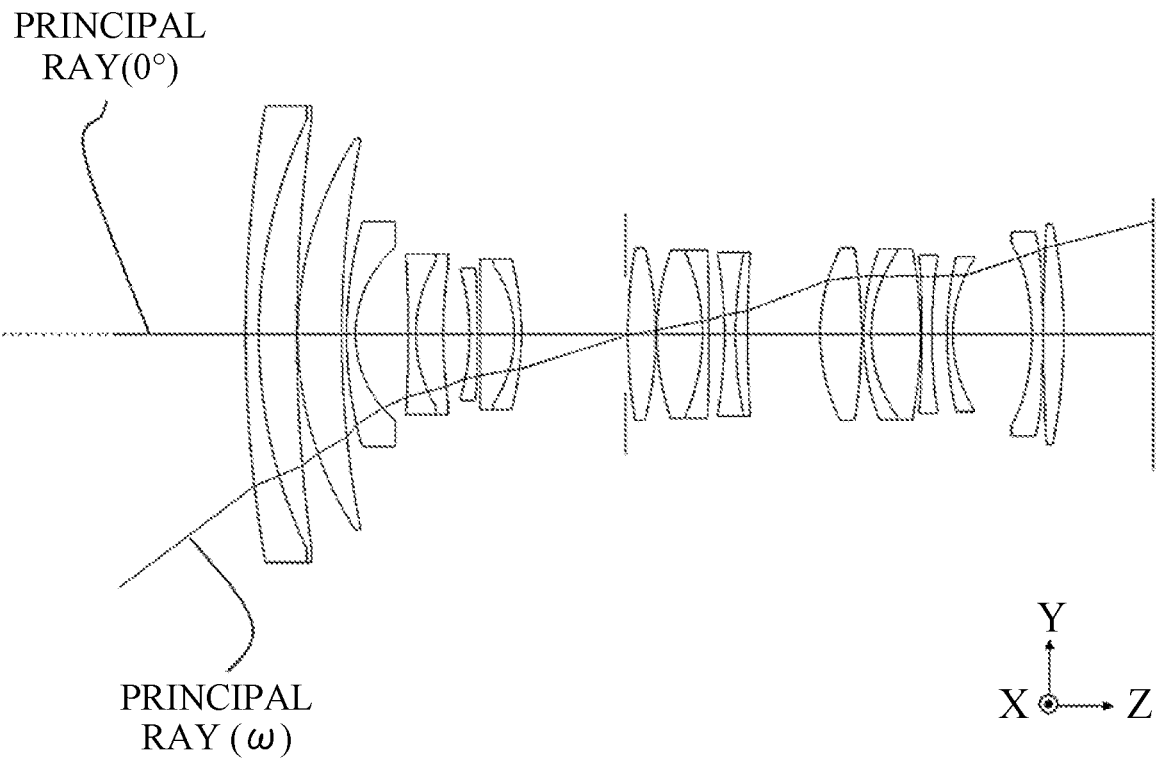
FIGS. 17A, 17B, and 17C are light beam trace diagrams of the optical system according to Numerical Example 1.
Figure 17B:
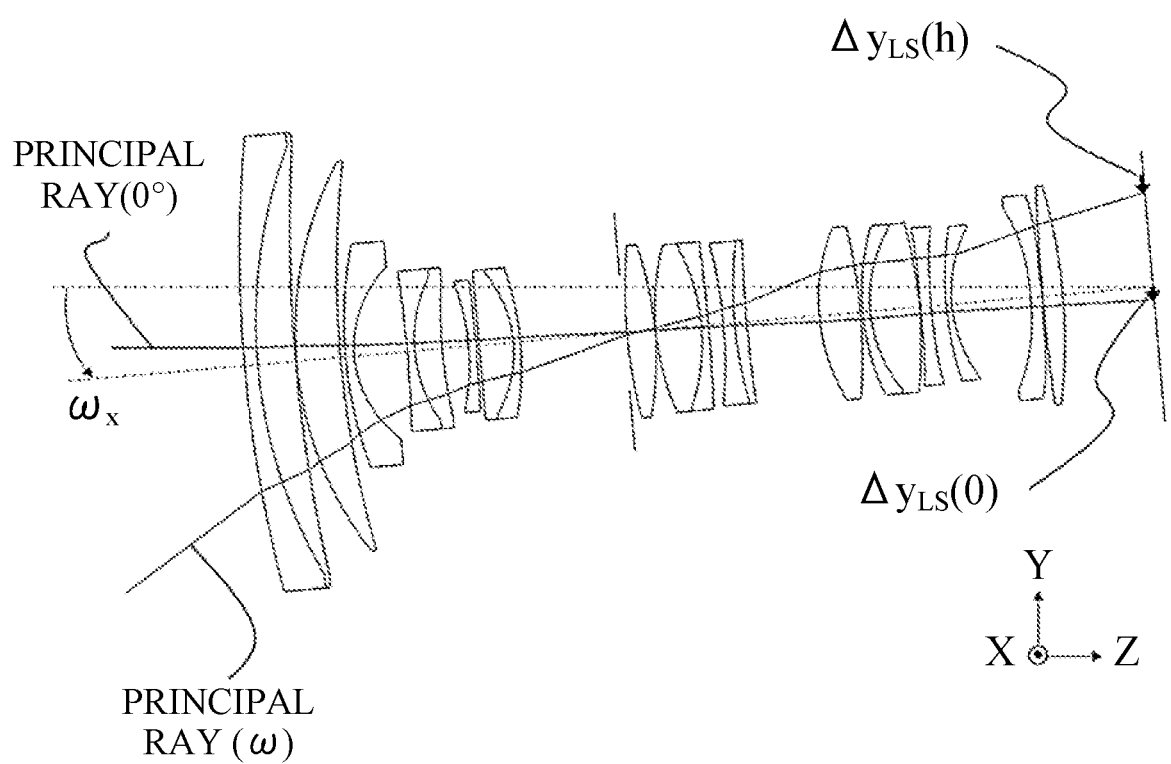
Figure 17C:
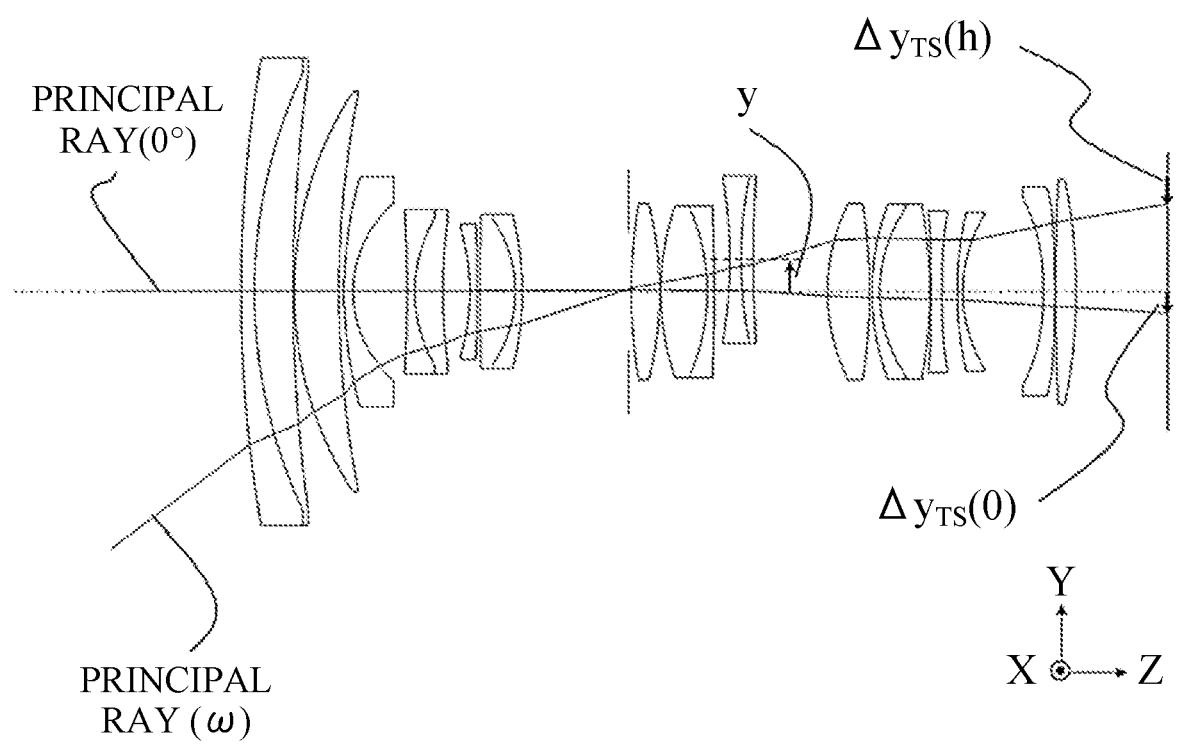
Figure 18A:
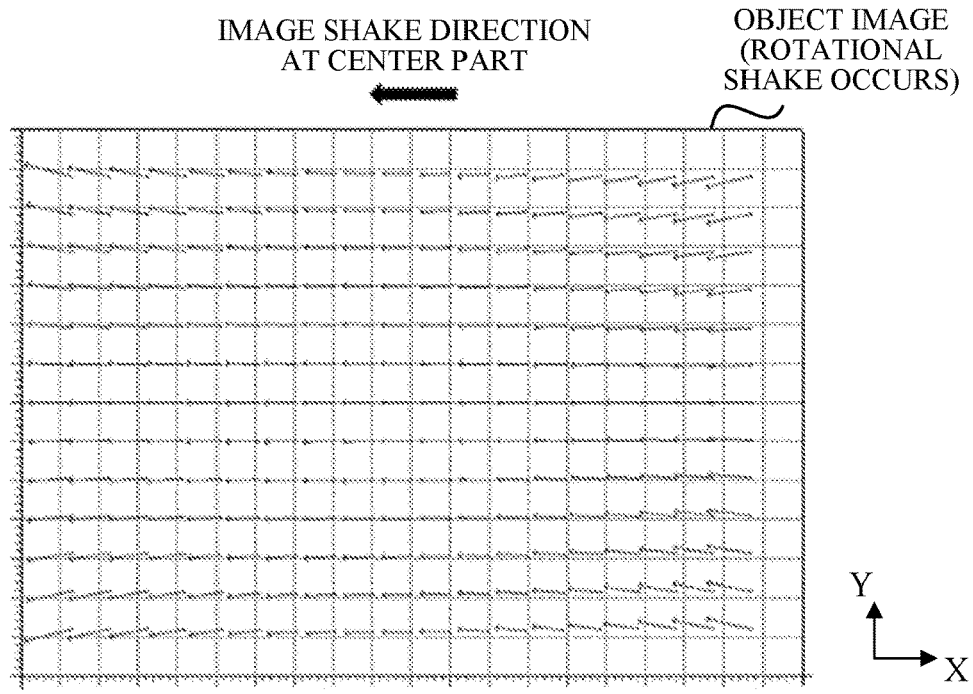
FIGS. 18A and 18B illustrate image point movement amounts and directions in the entire image plane at angle shake occurrence and image blur residue amounts and directions in the entire image plane after conventional image stabilization.
Figure 18B:
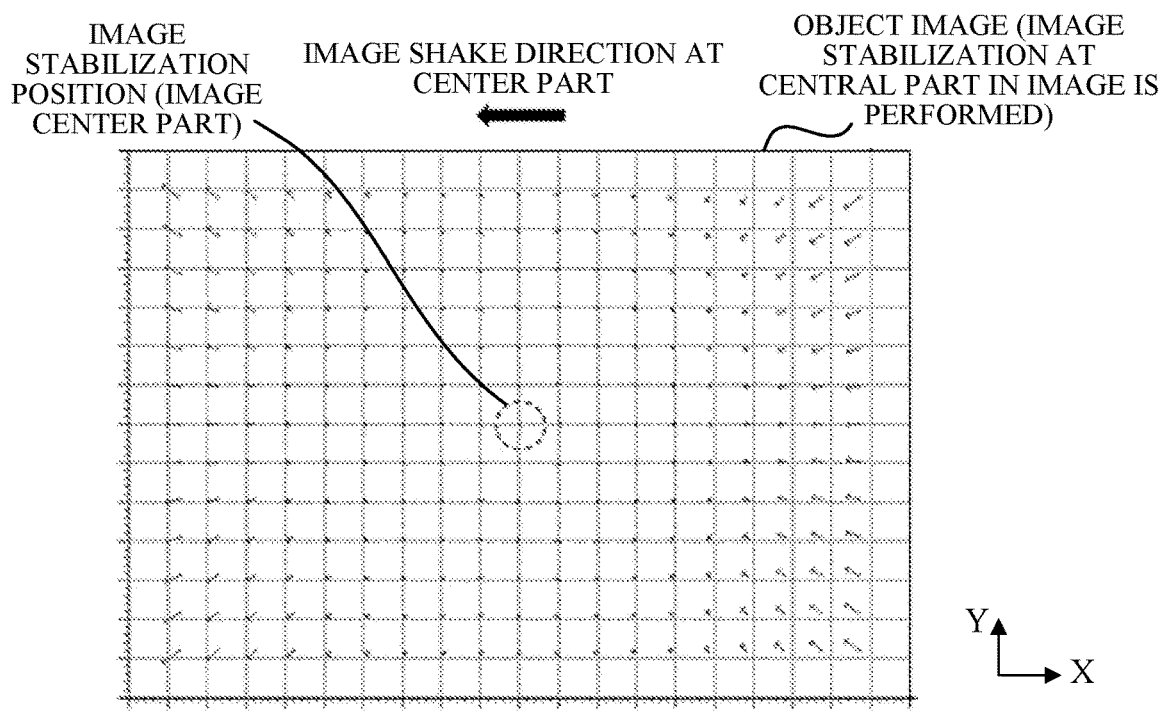

FIGS. 17A to 17C trace principal rays incident from the object side for the d line corresponding to half angles of view 0° and ω in the optical system L0 according to Numerical Example 1. FIG. 17A illustrates a state in which the optical system L0 is at rest squarely facing the object, and FIG. 17B illustrates a state in which the optical system L0 is tilted by a tilt angle $\omega_x$ in a tilt direction about the X axis with a center at an intersection point between the image plane IP and the optical axis. FIG. 17C illustrates a state in which the OIS optical system is decentered by a decentering amount y in the Y-axis direction (the decentering direction) in the state of FIG. 17B.

The tilt-image shift sensitivity for each image height in the tilt direction is acquired by dividing, by the tilt angle $\omega_x$, an image point movement amount $\Delta y_{LSr}(h_r)$ that is the difference between imaging positions of the principal rays corresponding to half angles of view 0° and ω in FIG. 17B on the image plane IP. The tilt-image shift sensitivity for each image height in a direction orthogonal to the tilt direction is acquired by using an image point movement amount $\Delta y_{LS\theta}$ for each image height $h_\theta$ in the X-axis direction.

The tilt-image shift sensitivities in each numerical example are acquired from the image point movement amounts in a case where the optical system L0 is tilted by 0.5°. The sign of the tilt angle $\omega_x$ is defined to be positive in the anticlockwise direction in FIG. 17B and negative in the clockwise direction. The sign of each image point movement amount Δy is defined to be positive in the upward direction and negative in the downward direction.

The decentering-image shift sensitivity for each image height in the decentering direction is acquired by dividing, by the decentering amount y of the OIS optical system, an image point movement amount $\Delta y_{TSr}(h_r)$ that is the difference between imaging positions of the principal rays corresponding to half angles of view 0° and ω in FIG. 17C on the image plane IP. In each numerical example, the decentering-image shift sensitivity for each image height in a direction orthogonal to the decentering direction is acquired by using an image point movement amount $\Delta y_{TS\theta}$ for each image height $h_\theta$ in the X-axis direction. Decentering-image shift sensitivity data is acquired from the image point movement amounts in a case where the OIS optical system is decentered by 0.1 mm.

In this example, image point positions used to derive the tilt-image shift sensitivities and the decentering-image shift sensitivities are acquired by using the imaging positions of the principal rays, but may be acquired by using peak positions of a modulation transfer function (MTF).

In this example, the tilt-image shift sensitivities and the decentering-image shift sensitivities are described as information for each image height in the image point movement direction at the image central part and in a direction orthogonal to the image point movement direction at angle shake occurrence, but may be information determined for each image point position on the entire imaging surface in a predetermined direction on the imaging surface. In this case, the tilt-image shift sensitivities and the decentering-image shift sensitivities may be directly acquired from the image point movement amounts on the entire imaging surface, which are acquired by using designed values of the optical system L0.

The tilt-image shift sensitivities and the decentering-image shift sensitivities may be calculated for each image height based on the focal length and the projection scheme as specifications of the optical system L0. Specifically, the tilt-image shift sensitivities and the decentering-image shift sensitivities only need to be information from which the amount of movement at a predetermined image point position upon tilt of the optical system L0 and the amount of movement at a predetermined image point position upon decentering of the OIS optical system 1014 can be acquired.

Each numerical example also indicates the OIS-IIS ratio suitable for image stabilization at the image central part and reducing the image blur residue amounts of the image peripheral part, the OIS-IIS ratio being calculated by using the tilt-image shift sensitivities, the OIS decentering-image shift sensitivities, and the correction coefficient of the image point movement amount described above. The image height in a case where the OIS-IIS ratio is calculated is 18.55 mm in Numerical Examples 1 and 2 and 17.23 mm in Numerical Example 3.

Figure 12:
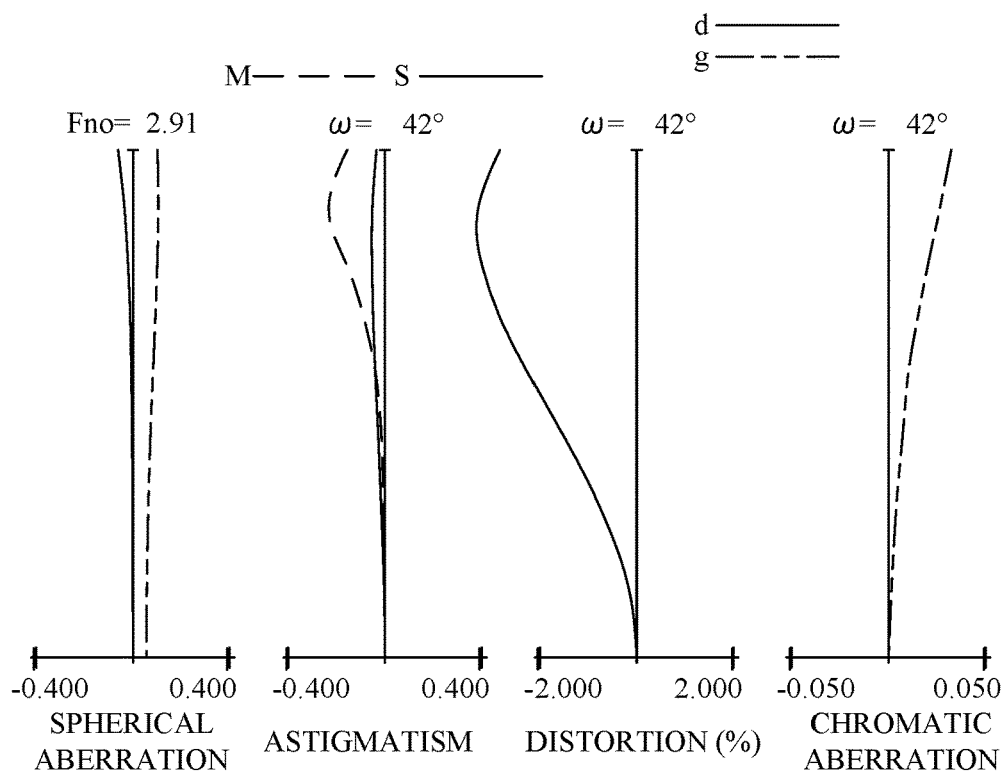
FIG. 12 is an aberration diagram of the optical system according to Numerical Example 1.
Figure 14:
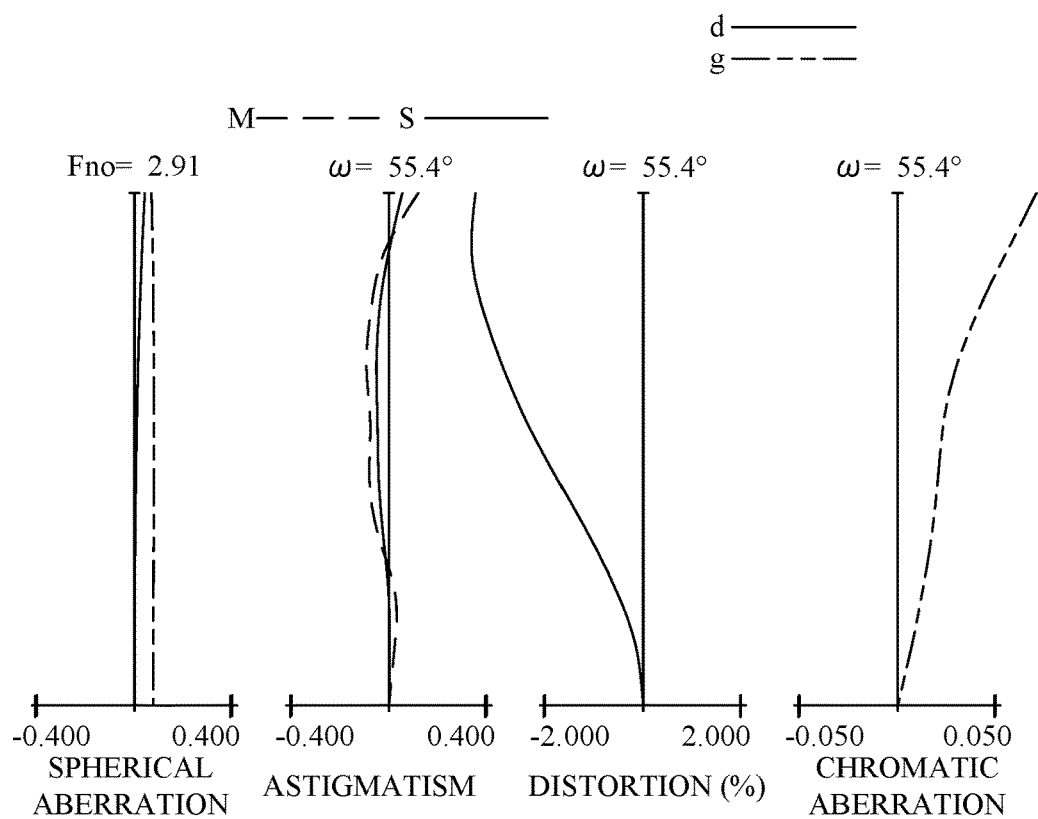
FIG. 14 is an aberration diagram of the optical system according to Numerical Example 2.
Figure 16:
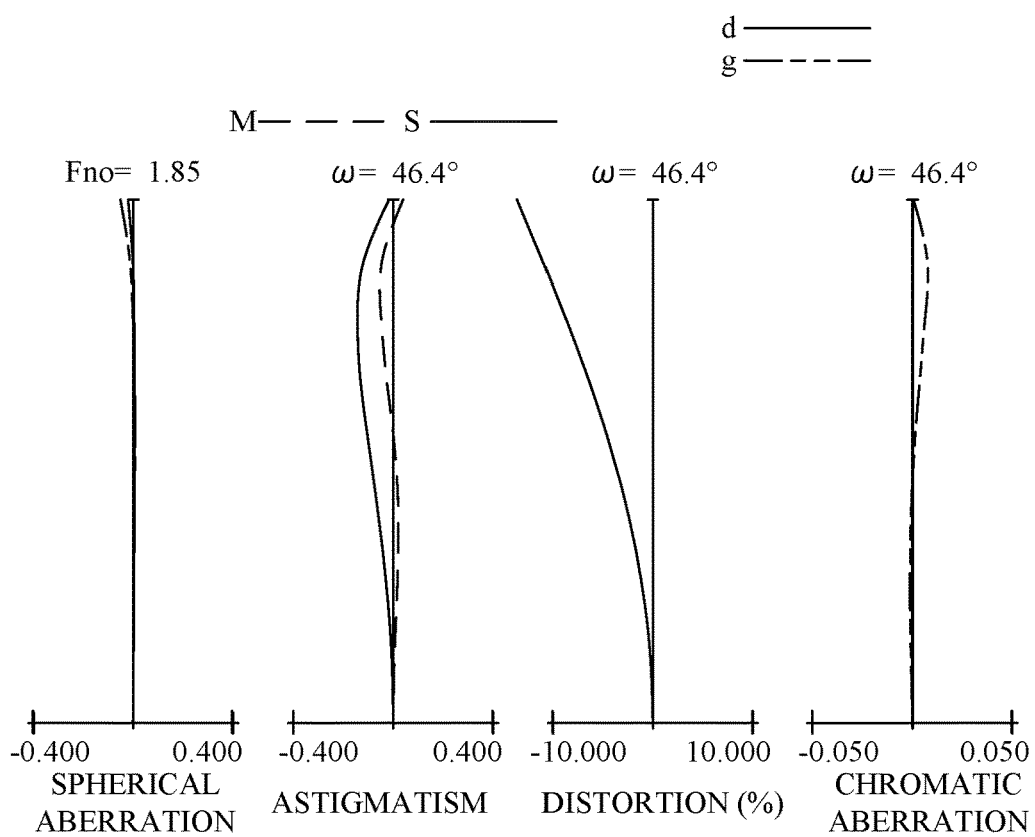
FIG. 16 is an aberration diagram of the optical system according to Numerical Example 3.

FIGS. 12 and 14 illustrate various aberrations (spherical aberration, astigmatism, distortion, and chromatic aberration) of the optical systems L0 according to Numerical Examples 1 and 2, respectively, in a state of in-focus on an infinity object at the wide-angle end. FIG. 16 illustrates various aberrations of the optical system L0 according to Numerical Example 3 a state of in-focus on an infinity object.

In each spherical aberration diagram, Fno represents the F number, a solid line illustrates spherical aberration at the d line (wavelength 587.6 nm), and a dashed and double-dotted line illustrates spherical aberration at the g line (wavelength 435.8 nm). In each astigmatism diagram, ω represents half angle of view (°), a solid line S illustrates the sagittal image plane, and a dashed line M illustrates the meridional image plane. Each distortion diagram illustrates distortion at the d line. Each chromatic aberration diagram illustrates chromatic aberration of magnification at the g line.

Numerical Example 1

UNIT: mm

Surface Data

| Surface No. | r | d | nd | vd |
|---|---|---|---|---|
| 1 | 211.125 | 2.10 | 1.80810 | 22.8 |
| 2 | 80.660 | 6.03 | 1.77250 | 49.6 |
| 3 | 248.854 | 0.15 | | |
| 4 | 57.558 | 6.97 | 1.77250 | 49.6 |
| 5 | 160.440 | (Variable) | | |
| 6 | 66.217 | 1.40 | 1.88300 | 40.8 |
| 7 | 18.113 | 8.41 | | |
| 8 | −206.710 | 1.20 | 1.61800 | 63.4 |
| 9 | 22.688 | 4.36 | 1.85478 | 24.8 |
| 10 | 79.196 | 4.20 | | |
| 11 | −35.317 | 1.20 | 1.58313 | 59.4 |
| 12* | −312.513 | 0.43 | | |
| 13 | 910.041 | 5.47 | 1.59270 | 35.3 |
| 14 | −19.928 | 1.10 | 1.88300 | 40.8 |
| 15 | −47.138 | (Variable) | | |
| 16(Diaphragm) | ∞ | 0.40 | | |
| 17 | 81.194 | 4.45 | 1.83481 | 42.7 |
| 18 | −54.244 | 0.15 | | |
| 19 | 41.217 | 7.25 | 1.49700 | 81.5 |
| 20 | −32.257 | 1.10 | 2.00069 | 25.5 |
| 21 | −293.896 | 2.41 | | |
| 22* | −71.464 | 1.75 | 1.76802 | 49.2 |
| 23 | 64.990 | 1.91 | 1.80810 | 22.8 |
| 24 | 199.742 | (Variable) | | |
| 25 | 30.855 | 6.56 | 1.59522 | 67.7 |
| 26 | −85.643 | 0.35 | | |
| 27 | 38.493 | 1.20 | 1.73800 | 32.3 |
| 28 | 22.868 | 7.83 | 1.53775 | 74.7 |
| 29 | −71.877 | 0.15 | | |
| 30* | −4310.465 | 1.70 | 1.85400 | 40.4 |
| 31* | 109.508 | (Variable) | | |
| 32 | 53.194 | 0.90 | 1.80400 | 46.6 |
| 33 | 22.891 | (Variable) | | |
| 34* | −42.821 | 1.70 | 1.58313 | 59.4 |
| 35* | −2156.781 | 0.15 | | |
| 36 | 344.261 | 3.20 | 2.00100 | 29.1 |
| 37 | −88.670 | (Variable) | | |
| Image Plane | ∞ | | | |

ASPHERIC DATA

12th Surface $K = 0.00000e+000$ $A\,4 = -5.69442e-006$ $A\,6 = -2.29053e-009$
$A\,8 = -4.72363e-011$ $A10 = 4.65343e-013$ $A12 = -1.99227e-015$ 22nd Surface $K = 0.00000e+000$ $A\,4 = 1.87606e-006$ $A\,6 = 1.45872e-009$ $A\,8 = 2.78338e-011$ $A10 = -2.10980e-013$ $A12 = 3.98590e-016$ 30th Surface $K = 0.00000e+000$ $A\,4 = -2.01869e-005$ $A\,6 = 6.17344e-008$
$A\,8 = -2.64177e-010$ $A10 = -2.98832e-013$ $A12 = 2.64092e-015$ 31st Surface $K = 0.00000e+000$ $A\,4 = 1.63774e-006$ $A\,6 = 9.32838e-008$
$A\,8 = -2.34772e-010$ $A10 = -7.39973e-013$ $A12 = 4.51086e-015$ 34th Surface $K = 0.00000e+000$ $A\,4 = -2.51719e-005$ $A\,6 = 1.25180e-007$
$A\,8 = -5.32709e-010$ $A10 = 5.08044e-013$ $A12 = 7.30860e-016$ 35th Surface $K = 0.00000e+000$ $A\,4 = -2.60571e-005$ $A\,6 = 1.26402e-007$
$A\,8 = -6.23562e-010$ $A10 = 1.45147e-012$ $A12 = -1.39940e-015$ Various Data Zoom Ratio 2.74

| | WIDE | MIDDLE | TELE |
|---|---|---|---|
| Focal Length | 24.72 | 43.76 | 67.66 |
| FNO | 2.91 | 2.91 | 2.91 |
| Half Angle of View | 42.00 | 25.95 | 17.34 |
| Image Height | 21.64 | 21.64 | 21.64 |
| Overall optical length | 144.33 | 158.18 | 172.04 |
| BF | 14.30 | 25.72 | 35.98 |
| d 5 | 0.80 | 17.81 | 28.91 |
| d15 | 16.54 | 8.10 | 2.46 |
| d24 | 11.55 | 5.41 | 3.56 |
| d31 | 2.38 | 1.11 | 0.91 |
| d33 | 12.58 | 13.85 | 14.04 |
| d37 | 14.30 | 25.72 | 35.98 |

Wide-Angle End First Off-Axis Direction

TABLE 1

| HALF ANGLE OF VIEW $\omega$ [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.216 | −0.431 | −0.067 | −0.671 |
| 7.1 | 3.09 | −0.218 | −0.436 | −0.068 | −0.676 |
| 14.1 | 6.18 | −0.224 | −0.449 | −0.069 | −0.693 |
| 20.8 | 9.27 | −0.237 | −0.474 | −0.072 | −0.723 |
| 27.1 | 12.37 | −0.256 | −0.513 | −0.077 | −0.769 |
| 32.8 | 15.46 | −0.286 | −0.573 | −0.083 | −0.835 |
| 37.8 | 18.55 | −0.332 | −0.664 | −0.093 | −0.929 |
| 42.0 | 21.64 | −0.402 | −0.804 | −0.107 | −1.068 |

Wide-Angle End Second Off-Axis Direction

TABLE 2

| HALF ANGLE OF VIEW $\omega$ [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.216 | −0.431 | −0.067 | −0.671 |
| 7.1 | 3.09 | −0.215 | −0.431 | −0.067 | −0.673 |
| 14.1 | 6.18 | −0.214 | −0.428 | −0.068 | −0.681 |
| 20.8 | 9.27 | −0.213 | −0.425 | −0.069 | −0.693 |
| 27.1 | 12.37 | −0.211 | −0.422 | −0.071 | −0.710 |
| 32.8 | 15.46 | −0.209 | −0.418 | −0.073 | −0.733 |
| 37.8 | 18.55 | −0.209 | −0.417 | −0.076 | −0.762 |
| 42.0 | 21.64 | −0.210 | −0.419 | −0.080 | −0.796 |

Intermediate (Middle) Zoom Position First Off-Axis Direction

TABLE 3

| HALF ANGLE OF VIEW $\omega$ [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.382 | −0.764 | −0.084 | −0.839 |
| 4.0 | 3.09 | −0.384 | −0.768 | −0.084 | −0.843 |
| 8.0 | 6.18 | −0.390 | −0.780 | −0.086 | −0.856 |
| 11.9 | 9.27 | −0.401 | −0.802 | −0.088 | −0.877 |
| 15.7 | 12.37 | −0.417 | −0.834 | −0.091 | −0.906 |
| 19.3 | 15.46 | −0.438 | −0.875 | −0.094 | −0.944 |
| 22.7 | 18.55 | −0.464 | −0.928 | −0.099 | −0.992 |
| 26.0 | 21.64 | −0.496 | −0.993 | −0.105 | −1.050 |

Intermediate (Middle) Zoom Position Second Off-Axis Direction

TABLE 4

| HALF ANGLE OF VIEW $\omega$ [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.382 | −0.764 | −0.084 | −0.839 |
| 4.0 | 3.09 | −0.382 | −0.764 | −0.084 | −0.841 |
| 8.0 | 6.18 | −0.382 | −0.765 | −0.085 | −0.847 |
| 11.9 | 9.27 | −0.383 | −0.766 | −0.086 | −0.856 |
| 15.7 | 12.37 | −0.384 | −0.767 | −0.087 | −0.869 |
| 19.3 | 15.46 | −0.385 | −0.769 | −0.089 | −0.885 |
| 22.7 | 18.55 | −0.386 | −0.772 | −0.090 | −0.905 |
| 26.0 | 21.64 | −0.388 | −0.776 | −0.093 | −0.928 |

Telephoto End First Off-Axis Direction

TABLE 5

| HALF ANGLE OF VIEW $\omega$ [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.590 | −1.181 | −0.099 | −0.993 |
| 2.6 | 3.09 | −0.592 | −1.184 | −0.100 | −0.997 |
| 5.2 | 6.18 | −0.598 | −1.197 | −0.101 | −1.007 |
| 7.8 | 9.27 | −0.609 | −1.218 | −0.102 | −1.025 |
| 10.3 | 12.37 | −0.623 | −1.247 | −0.105 | −1.049 |
| 12.7 | 15.46 | −0.642 | −1.285 | −0.108 | −1.079 |
| 15.1 | 18.55 | −0.665 | −1.329 | −0.111 | −1.114 |
| 17.3 | 21.64 | −0.690 | −1.379 | −0.115 | −1.153 |

Telephoto End Second Off-Axis Direction

TABLE 6

| HALF ANGLE OF VIEW $\omega$ [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.590 | −1.181 | −0.099 | −0.993 |
| 2.6 | 3.09 | −0.591 | −1.182 | −0.100 | −0.995 |
| 5.2 | 6.18 | −0.592 | −1.183 | −0.100 | −1.000 |
| 7.8 | 9.27 | −0.593 | −1.187 | −0.101 | −1.008 |
| 10.3 | 12.37 | −0.595 | −1.191 | −0.102 | −1.019 |
| 12.7 | 15.46 | −0.598 | −1.196 | −0.103 | −1.032 |
| 15.1 | 18.55 | −0.601 | −1.203 | −0.105 | −1.049 |
| 17.3 | 21.64 | −0.605 | −1.210 | −0.107 | −1.067 |

Control Ratio (Wide-Angle End, Intermediate Zoom Position, Telephoto End)

TABLE 7

CONTROL RATIO OF NUMERICAL EXAMPLE 1

| | WIDE-ANGLE | | MIDDLE | | TELEPHOTO | |
|---|---|---|---|---|---|---|
| | MINIMIZE SUM OF IMAGE BLUR RESIDUE AMOUNTS OF TWO AXES | MINIMIZE DIFFERENCE OF IMAGE BLUR RESIDUE AMOUNTS OF TWO AXES | MINIMIZE SUM OF IMAGE BLUR RESIDUE AMOUNTS OF TWO AXES | MINIMIZE DIFFERENCE OF IMAGE BLUR RESIDUE AMOUNTS OF TWO AXES | MINIMIZE SUM OF IMAGE BLUR RESIDUE AMOUNTS OF TWO AXES | MINIMIZE DIFFERENCE OF IMAGE BLUR RESIDUE AMOUNTS OF TWO AXES |
| OIS RATIO α | 1.40 | 0.97 | 1.18 | 0.87 | 1.03 | 0.81 |
| IIS RATIO β | −0.40 | 0.03 | −0.18 | 0.13 | −0.03 | 0.19 |

Numerical Example 2

UNIT: mm

Surface Data

| Surface No. | r | d | nd | νd |
|---|---|---|---|---|
| 1* | 3000.000 | 2.85 | 1.58313 | 59.4 |
| 2* | 16.526 | 10.57 | | |
| 3* | −809.327 | 2.25 | 1.85400 | 40.4 |
| 4* | 91.828 | 5.56 | | |
| 5 | −53.256 | 1.20 | 1.59522 | 67.7 |
| 6 | 68.528 | 0.15 | | |
| 7 | 43.587 | 5.03 | 1.85478 | 24.8 |
| 8 | −485.244 | (Variable) | | |
| 9 | 63.607 | 2.67 | 1.84666 | 23.9 |
| 10 | −1472.964 | 0.15 | | |
| 11 | 52.737 | 1.00 | 1.92286 | 20.9 |
| 12 | 22.996 | 5.41 | 1.53172 | 48.8 |
| 13 | 489.976 | (Variable) | | |
| 14(Diaphragm) | ∞ | (Variable) | | |
| 15 | 27.733 | 1.20 | 2.00069 | 25.5 |
| 16 | 19.641 | 9.29 | 1.53775 | 74.7 |
| 17 | −78.882 | (Variable) | | |
| 18 | −67.558 | 4.31 | 1.92286 | 20.9 |
| 19 | −20.948 | 0.77 | 1.83400 | 37.2 |
| 20 | 136.126 | 3.52 | | |
| 21 | ∞ | (Variable) | | |
| 22 | 30.487 | 11.20 | 1.49700 | 81.6 |
| 23 | −50.182 | 0.15 | | |
| 24 | 40.928 | 11.00 | 1.49700 | 81.6 |
| 25 | −25.800 | 1.20 | 2.05090 | 26.9 |
| 26 | 208.835 | 4.54 | | |
| 27* | −73.669 | 2.10 | 1.85400 | 40.4 |
| 28* | −1000.000 | 0.15 | | |
| 29 | 216.036 | 3.40 | 1.92286 | 20.9 |
| 30 | −127.538 | (Variable) | | |
| Image Plane | ∞ | | | |

ASPHERIC DATA

1st Surface

K = 0.00000e+000 A 4 = 8.30213e−006 A 6 = −1.33976e−008 A 8 = 4.25008e−011 A10 = −8.60253e−014 A12 = 1.03363e−016 A14 = −7.03702e−020 A16 = 2.16318e−023

2nd Surface

K = −9.81344e−001 A 4 = 4.49709e−007 A 6 = −2.34544e−008 A 8 = −1.05516e−010 A10 = 8.07443e−013 A12 = −2.78552e−015 A14 = 3.05128e−018

-continued

UNIT: mm

3rd Surface

K = 0.00000e+000 A 4 = −9.01759e−006 A 6 = −1.39642e−007 A 8 = 1.23272e−009 A10 = −3.49283e−012 A12 = 3.62808e−015 A14 = 5.24953e−019 A16 = −2.43479e−021

4th Surface

K = 0.00000e+000 A 4 = 6.34981e−006 A 6 = −1.29871e−007 A 8 = 1.67920e−009 A10 = −6.48374e−012 A12 = 1.50043e−014 A14 = −1.59777e−017

27th Surface

K = 0.00000e+000 A 4 = −8.04129e−005 A 6 = 2.64851e−007 A 8 = −1.06038e−009 A10 = 4.87911e−012 A12 = −8.56493e−015 A14 = −1.17880e−018 A16 = −3.10043e−023

28th Surface

K = 0.00000e+000 A 4 = −6.00659e−005 A 6 = 2.67376e−007 A 8 = −7.05021e−010 A10 = 2.04492e−012 A12 = −2.97985e−015

Various Data
Zoom Ratio 2.20

| | WIDE | MIDDLE | TELE |
|---|---|---|---|
| Focal Length | 15.45 | 24.00 | 33.95 |
| FNO | 2.91 | 2.91 | 2.91 |
| Half Angle of View | 55.41 | 41.57 | 31.88 |
| Image Heigh | 21.64 | 21.64 | 21.64 |
| Overall optical length | 159.58 | 147.48 | 144.99 |
| BF | 14.00 | 22.21 | 32.15 |
| d 8 | 25.32 | 7.72 | 1.50 |
| d13 | 8.24 | 11.30 | 7.40 |
| d14 | 13.71 | 5.42 | 0.71 |
| d17 | 1.60 | 9.89 | 14.61 |
| d21 | 7.04 | 1.27 | −1.05 |
| d30 | 14.00 | 22.21 | 32.15 |

Wide-Angle End First Off-Axis Direction

TABLE 8

| HALF ANGLE OF VIEW ω [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.135 | −0.270 | −0.066 | −0.665 |
| 11.3 | 3.09 | −0.139 | −0.278 | −0.067 | −0.671 |
| 22.0 | 6.18 | −0.153 | −0.305 | −0.069 | −0.689 |
| 31.4 | 9.27 | −0.177 | −0.353 | −0.072 | −0.722 |
| 39.4 | 12.37 | −0.212 | −0.425 | −0.077 | −0.773 |
| 45.9 | 15.46 | −0.261 | −0.521 | −0.085 | −0.846 |
| 51.2 | 18.55 | −0.323 | −0.647 | −0.095 | −0.955 |
| 55.4 | 21.64 | −0.406 | −0.813 | −0.111 | −1.107 |

Wide-Angle End Second Off-Axis Direction

TABLE 9

| HALF ANGLE OF VIEW ω [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.135 | −0.270 | −0.066 | −0.665 |
| 11.3 | 3.09 | −0.135 | −0.269 | −0.067 | −0.668 |
| 22.0 | 6.18 | −0.134 | −0.267 | −0.068 | −0.676 |
| 31.4 | 9.27 | −0.133 | −0.265 | −0.069 | −0.690 |
| 39.4 | 12.37 | −0.131 | −0.263 | −0.071 | −0.709 |
| 45.9 | 15.46 | −0.131 | −0.261 | −0.073 | −0.735 |
| 51.2 | 18.55 | −0.130 | −0.260 | −0.077 | −0.766 |
| 55.4 | 21.64 | −0.130 | −0.260 | −0.080 | −0.804 |

Intermediate (Middle) Zoom Position First Off-Axis Direction

TABLE 10

| HALF ANGLE OF VIEW ω [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.209 | −0.419 | −0.078 | −0.777 |
| 7.3 | 3.09 | −0.213 | −0.425 | −0.078 | −0.782 |
| 14.5 | 6.18 | −0.222 | −0.445 | −0.079 | −0.795 |
| 21.2 | 9.27 | −0.239 | −0.479 | −0.082 | −0.817 |
| 27.3 | 12.37 | −0.265 | −0.530 | −0.085 | −0.852 |
| 32.7 | 15.46 | −0.300 | −0.600 | −0.090 | −0.901 |
| 37.5 | 18.55 | −0.347 | −0.693 | −0.097 | −0.966 |
| 41.6 | 21.64 | −0.410 | −0.819 | −0.106 | −1.057 |

Intermediate (Middle) Zoom Position Second Off-Axis Direction

TABLE 11

| HALF ANGLE OF VIEW ω [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.209 | −0.419 | −0.078 | −0.777 |
| 7.3 | 3.09 | −0.209 | −0.419 | −0.078 | −0.779 |
| 14.5 | 6.18 | −0.209 | −0.419 | −0.079 | −0.786 |
| 21.2 | 9.27 | −0.209 | −0.418 | −0.080 | −0.797 |
| 27.3 | 12.37 | −0.209 | −0.419 | −0.081 | −0.812 |
| 32.7 | 15.46 | −0.210 | −0.420 | −0.083 | −0.832 |
| 37.5 | 18.55 | −0.211 | −0.422 | −0.086 | −0.856 |
| 41.6 | 21.64 | −0.213 | −0.426 | −0.089 | −0.886 |

Telephoto End First Off-Axis Direction

TABLE 12

| HALF ANGLE OF VIEW ω [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.296 | −0.593 | −0.094 | −0.940 |
| 5.2 | 3.09 | −0.299 | −0.598 | −0.094 | −0.944 |
| 10.3 | 6.18 | −0.307 | −0.614 | −0.096 | −0.955 |
| 15.2 | 9.27 | −0.320 | −0.640 | −0.097 | −0.975 |
| 19.9 | 12.37 | −0.340 | −0.680 | −0.100 | −1.003 |
| 24.3 | 15.46 | −0.367 | −0.735 | −0.104 | −1.043 |
| 28.3 | 18.55 | −0.403 | −0.806 | −0.109 | −1.094 |
| 31.9 | 21.64 | −0.449 | −0.897 | −0.116 | −1.161 |

Telephoto End Second Off-Axis Direction

TABLE 13

| HALF ANGLE OF VIEW ω [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.296 | −0.593 | −0.094 | −0.940 |
| 5.2 | 3.09 | −0.296 | −0.593 | −0.094 | −0.942 |
| 10.3 | 6.18 | −0.297 | −0.594 | −0.095 | −0.948 |
| 15.2 | 9.27 | −0.297 | −0.594 | −0.096 | −0.957 |
| 19.9 | 12.37 | −0.298 | −0.596 | −0.097 | −0.970 |
| 24.3 | 15.46 | −0.299 | −0.598 | −0.099 | −0.987 |
| 28.3 | 18.55 | −0.301 | −0.602 | −0.101 | −1.008 |
| 31.9 | 21.64 | −0.304 | −0.607 | −0.103 | −1.034 |

Control Ratio (Wide-Angle End, Intermediate Zoom Position, Telephoto End)

TABLE 14

CONTROL RATIO OF NUMERICAL EXAMPLE 2

| | WIDE-ANGLE | | MIDDLE | | TELEPHOTO | |
|---|---|---|---|---|---|---|
| | MINIMIZE SUM OF IMAGE BLUR RESIDUE AMOUNTS OF TWO AXES | MINIMIZE DIFFERENCE OF IMAGE BLUR RESIDUE AMOUNTS OF TWO AXES | MINIMIZE SUM OF IMAGE BLUR RESIDUE AMOUNTS OF TWO AXES | MINIMIZE DIFFERENCE OF IMAGE BLUR RESIDUE AMOUNTS OF TWO AXES | MINIMIZE SUM OF IMAGE BLUR RESIDUE AMOUNTS OF TWO AXES | MINIMIZE DIFFERENCE OF IMAGE BLUR RESIDUE AMOUNTS OF TWO AXES |
| OIS RATIO $\alpha$ | 3.21 | 2.32 | 2.70 | 1.92 | 2.19 | 1.58 |
| IIS RATIO $\beta$ | -2.21 | -1.32 | -1.70 | -0.92 | -1.19 | -0.58 |

Numerical Example 3

UNIT: mm

Surface Data

| Surface No. | r | d | nd | vd |
|---|---|---|---|---|
| 1 | 50.658 | 1.57 | 1.48749 | 70.2 |
| 2 | 17.433 | 7.73 | | |
| 3 | 82.620 | 1.50 | 1.48749 | 70.2 |
| 4 | 22.068 | 13.94 | | |
| 5 | 28.055 | 5.75 | 1.90043 | 37.4 |
| 6 | -26.190 | 1.00 | 1.80000 | 29.8 |
| 7 | -678.364 | 6.06 | | |
| 8(Diaphragm) | ∞ | 2.86 | | |
| 9 | 74.460 | 1.40 | 1.77250 | 49.6 |
| 10 | -3498.619 | 2.98 | | |
| 11 | -20.479 | 1.00 | 1.85478 | 24.8 |
| 12 | 30.759 | 3.15 | 1.49700 | 81.5 |
| 13 | -76.152 | 0.29 | | |
| 14 | 107.343 | 4.13 | 1.58313 | 59.4 |
| 15* | -42.035 | 0.15 | | |
| 16 | 108.394 | 4.96 | 1.85150 | 40.8 |
| 17 | -35.438 | (Variable) | | |
| 18 | -72.427 | 1.84 | 1.83481 | 42.7 |
| 19 | -45.108 | 10.50 | | |
| 20 | -23.819 | 1.57 | 1.51742 | 52.4 |
| 21 | -53.298 | 11.00 | | |
| Image Plane | ∞ | | | |

ASPHERIC DATA

15th Surface

K = 0.00000e+000 A 4 = 2.14904e-005 A 6 = -6.26885e-009 A 8 = 3.11936e-010 A10 = -1.96590e-012 A12 = 3.25155e-015

Various Data

| Focal Length | 20.60 |
|---|---|
| FNO | 1.85 |
| Half Angle of View | 46.42 |
| Image Height | 18.71 |
| Overall optical length | 84.88 |
| BF | 11.00 |

| | Infinity | Close |
|---|---|---|
| d17 | 1.50 | 11.92 |

In-Focus At Infinity First Off-Axis Direction

TABLE 15

| HALF ANGLE OF VIEW ω [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta (h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta (h_\theta)$ [mm/mm] | CORRECTION COEFFICIENT OF IMAGE POINT MOVEMENT AMOUNT $\Delta h0/\Delta h (h_\theta)$ |
|---|---|---|---|---|---|---|
| 0.0 | 0.00 | -0.180 | -0.359 | 0.030 | 0.299 | 1.00 |
| 8.5 | 3.08 | -0.181 | -0.363 | 0.030 | 0.302 | 1.01 |
| 16.7 | 6.08 | -0.186 | -0.373 | 0.031 | 0.312 | 1.05 |
| 24.2 | 8.95 | -0.194 | -0.389 | 0.033 | 0.327 | 1.11 |
| 31.0 | 11.64 | -0.206 | -0.411 | 0.035 | 0.346 | 1.19 |
| 36.9 | 14.16 | -0.220 | -0.440 | 0.037 | 0.369 | 1.27 |
| 42.0 | 16.50 | -0.238 | -0.476 | 0.039 | 0.395 | 1.36 |
| 46.4 | 18.71 | -0.259 | -0.519 | 0.042 | 0.422 | 1.44 |

In-Focus At Infinity Second Off-Axis Direction

TABLE 16

| HALF ANGLE OF VIEW ω [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.180 | −0.359 | 0.030 | 0.299 |
| 8.5 | 3.08 | −0.179 | −0.358 | 0.030 | 0.301 |
| 16.7 | 6.08 | −0.177 | −0.354 | 0.031 | 0.306 |
| 24.2 | 8.95 | −0.173 | −0.347 | 0.031 | 0.314 |
| 31.0 | 11.64 | −0.169 | −0.339 | 0.032 | 0.324 |
| 36.9 | 14.16 | −0.165 | −0.329 | 0.034 | 0.336 |
| 42.0 | 16.50 | −0.160 | −0.320 | 0.035 | 0.349 |
| 46.4 | 18.71 | −0.155 | −0.311 | 0.036 | 0.363 |

In-Focus On Close End First Off-Axis Direction

TABLE 17

| HALF ANGLE OF VIEW ω [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] | CORRECTION COEFFICIENT OF IMAGE POINT MOVEMENT AMOUNT $\Delta h0/\Delta h(h_\theta)$ |
|---|---|---|---|---|---|---|
| 0.0 | 0.00 | −0.404 | −0.807 | 0.036 | 0.364 | 1.00 |
| 7.2 | 3.08 | −0.403 | −0.806 | 0.037 | 0.367 | 1.01 |
| 14.3 | 6.13 | −0.401 | −0.802 | 0.038 | 0.376 | 1.03 |
| 21.0 | 9.09 | −0.398 | −0.796 | 0.039 | 0.391 | 1.06 |
| 27.2 | 11.94 | −0.394 | −0.789 | 0.041 | 0.410 | 1.11 |
| 32.8 | 14.66 | −0.391 | −0.782 | 0.043 | 0.433 | 1.18 |
| 37.8 | 17.23 | −0.388 | −0.777 | 0.046 | 0.458 | 1.27 |
| 42.3 | 19.67 | −0.385 | −0.770 | 0.048 | 0.484 | 1.52 |

In-Focus On Close End Second Off-Axis Direction

TABLE 18

| HALF ANGLE OF VIEW ω [deg] | IMAGE HEIGHT $h_\theta$ [mm] | IMAGE POINT MOVEMENT AMOUNT $\Delta y_{LS\theta}$ WHEN TILTED BY 0.5 DEGREES [mm] | TILT-IMAGE SHIFT SENSITIVITIES $LS_\theta(h_\theta)$ [mm/deg] | IMAGE POINT MOVEMENT AMOUNT $\Delta y_{TS\theta}$ AFTER DECENTERED BY 0.1 mm [mm] | DECENTERING SENSITIVITY $TS_\theta(h_\theta)$ [mm/mm] |
|---|---|---|---|---|---|
| 0.0 | 0.00 | −0.404 | −0.807 | 0.036 | 0.364 |
| 7.2 | 3.08 | −0.402 | −0.804 | 0.037 | 0.366 |
| 14.3 | 6.13 | −0.398 | −0.796 | 0.037 | 0.370 |
| 21.0 | 9.09 | −0.392 | −0.783 | 0.038 | 0.378 |
| 27.2 | 11.94 | −0.383 | −0.766 | 0.039 | 0.388 |
| 32.8 | 14.66 | −0.373 | −0.745 | 0.040 | 0.399 |
| 37.8 | 17.23 | −0.361 | −0.722 | 0.041 | 0.413 |
| 42.3 | 19.67 | −0.348 | −0.697 | 0.043 | 0.427 |

Control Ratio (Infinity, Close End)

TABLE 19

CONTROL RATIO OF NUMERICAL EXAMPLE 3

| | INFINITY | | CLOSE | |
|---|---|---|---|---|
| | MINIMIZE SUM OF IMAGE BLUR RESIDUE AMOUNTS OF TWO AXES | MINIMIZE DIFFERENCE OF IMAGE BLUR RESIDUE AMOUNTS OF TWO AXES | MINIMIZE SUM OF IMAGE BLUR RESIDUE AMOUNTS OF TWO AXES | MINIMIZE DIFFERENCE OF IMAGE BLUR RESIDUE AMOUNTS OF TWO AXES |
| OIS RATIO α | 1.01 | 0.55 | −0.15 | −0.33 |
| IIS RATIO β | −0.01 | 0.45 | 1.15 | 1.33 |

As described above, each example can excellently perform correction of image blurs at the image central part and reduce an image blur residue at the image peripheral part by setting the OIS-IIS ratio properly.

The projection scheme of the image pickup optical system 101 (optical system L0) is not limited to the central projection scheme but may be any other projection scheme such as an equal-stereoscopic-angle projection scheme.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-152405, filed on Sep. 26, 2022, which is hereby incorporated by reference herein in its entirety.

What is claimed is:

1. A control apparatus configured to set a control ratio of control of drive of a first image stabilization unit and a second image stabilization unit that correct an image blur along with shake of an optical apparatus including an optical system, the control apparatus comprising:
a memory storing instructions; and
a processor configured to execute the instructions to set, as the control ratio in accordance with image shift sensitivities for tilt of the optical system and image shift sensitivities for drive of the first and second image stabilization units, the control ratio with which an image blur at an image central part is corrected and an image blur residue amount at an image peripheral part is reduced, in a case where the image shift sensitivities for tilt of the optical system for each image height in a first image height direction and a second image height direction different from each other, respectively, are different from each other, the image shift sensitivities for drive of the first and second image stabilization units, respectively, in the first image height direction are different from each other, and the image shift sensitivities for drive of the first and second image stabilization units, respectively, in the second image height direction are different from each other.

2. The control apparatus according to claim 1, wherein the first image height direction is a direction in which an image point at the image central part moves due to the shake.

3. The control apparatus according to claim 1, wherein the processor is configured to set the control ratio so that the image blur residue amount at least at an image height position in the first image height direction at the image peripheral part is smaller than in a case where an image blur at the image central part is corrected by one of the first and second image stabilization units.

4. The control apparatus according to claim 1, wherein the first image height direction and the second image height direction are orthogonal to each other.

5. The control apparatus according to claim 1, wherein the processor is configured to set the control ratio so that the image blur residue amount at a first image height position in the first image height direction and a second image height position of the same image height as a first image height in the second image height direction at the image peripheral part decreases.

6. The control apparatus according to claim 1, wherein the processor is configured to set the control ratio so that difference between the image blur residue amounts at a first image height position in the first image height direction and a second image height position of the same image height as the first image height in the second image height direction, respectively, at the image peripheral part is smaller than in a case where an image blur at the image central part is corrected by one of the first and second image stabilization units.

7. The control apparatus according to claim 1, wherein the processor is configured to set the control ratio so that the sum of the image blur residue amounts at a first image height position in the first image height direction and a second image height position of the same image height as the first image height in the second image height direction, respectively, at the image peripheral part is smaller than in a case where an image blur at the image central part is corrected by one of the first and second image stabilization units.

8. The control apparatus according to claim 1, wherein the processor is configured to:
    acquire information about the image shift sensitivities, and
    the control ratio by using the information about the image shift sensitivities.

9. The control apparatus according to claim 8, wherein the processor is configured to acquire information about the image shift sensitivities of the first and second image stabilization units by using information about image point movement sensitivities for tilt of the optical system for each image height and information about image point movement sensitivities for drive of the first and second image stabilization units, respectively, for each image height.

10. The control apparatus according to claim 1, wherein the memory stores information about the control ratio acquired in accordance with the image shift sensitivities for the tilt and the image shift sensitivities for the drive, and
    wherein the processor is configured to read the information about the control ratio and set the control ratio.

11. The control apparatus according to claim 1, wherein at least one of the values of a focal length and an object distance that is focusable is variable in the optical system, and
    wherein the processor is configured to set the control ratio in accordance with the at least one value.

12. The control apparatus according to claim 1, wherein the processor is configured to set the control ratio by using a designed value of the optical system.

13. The control apparatus according to claim 1, wherein the first image stabilization unit is a lens unit included in the optical system that forms an object image, and
    wherein the second image stabilization unit is an image sensor that captures the object image.

14. The control apparatus according to claim 1, wherein the first and second image stabilization units are each a lens unit included in the optical system that forms an object image.

15. The control apparatus according to claim 1, wherein the first image stabilization unit is a lens unit that forms an object image, and
    wherein the second image stabilization unit moves a cutout area from an image generated by an image sensor that captures the object image.

16. The control apparatus according to claim 1, wherein the optical system of the optical apparatus has distortion, and
    wherein the processor is configured to set the control ratio corresponding to electronic correction for image distortion due to the distortion.

17. An image stabilization apparatus comprising:
a control apparatus; and
a drive control unit configured to control drive of a first image stabilization unit and a second image stabilization unit in accordance with a control ratio set by the control apparatus,
wherein the control apparatus sets a control ratio of control of drive of the first image stabilization unit and the second image stabilization unit that correct an image blur along with shake of an optical apparatus including an optical system, and includes:
a memory storing instructions; and
a processor configured to execute the instructions to set, as the control ratio in accordance with image shift sensitivities for tilt of the optical system and image shift sensitivities for drive of the first and second image stabilization units, the control ratio with which an image blur at an image central part is corrected and an image blur residue amount at an image peripheral part is reduced, in a case where the image shift sensitivities for tilt of the optical system for each image height in a first image height direction and a second image height direction different from each other, respectively, are different from each other, the image shift sensitivities for drive of the first and second image stabilization units, respectively, in the first image height direction are different from each other, and the image shift sensitivities for drive of the first and second image stabilization units, respectively, in the second image height direction are different from each other.

18. An optical apparatus comprising:
the image stabilization apparatus according to claim 17; and
at least one of the first and second image stabilization units.

19. A control method of controlling drive of a first image stabilization unit and a second image stabilization unit that correct an image blur along with shake of an optical apparatus including an optical system, the control method comprising controlling drive of the first and the second image stabilization units, in a case where image shift sensitivities for tilt of the optical system for each image height in a first image height direction and a second image height direction different from each other, respectively, are different from each other, image shift sensitivities for drive of the first and second image stabilization units, respectively, in the first image height direction are different from each other, and image shift sensitivities for drive of the first and second image stabilization units, respectively, in the second image height direction are different from each other, by using, as a control ratio in accordance with the image shift sensitivities for tilt of the optical system and the image shift sensitivities for drive of the first and second image stabilization units, the control ratio with which an image blur at an image central part is corrected and an image blur residue amount at an image peripheral part is reduced.

20. A non-transitory computer-readable storage medium storing a computer program configured to cause a computer to execute processing in accordance with the control method according to claim 19.

* * * * *